United States Patent
Mansour et al.

(10) Patent No.: US 11,107,488 B1
(45) Date of Patent: Aug. 31, 2021

(54) REDUCED REFERENCE CANCELLER

(71) Applicant: Amazon Technologies, Inc., Seattle, WA (US)

(72) Inventors: Mohamed Mansour, Cupertino, CA (US); Shobha Devi Kuruba Buchannagari, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/662,696

(22) Filed: Oct. 24, 2019

(51) Int. Cl.
| | |
|---|---|
| *G10L 21/0232* | (2013.01) |
| *H04R 1/40* | (2006.01) |
| *H04R 3/00* | (2006.01) |
| *G10L 21/0208* | (2013.01) |
| *H04R 3/12* | (2006.01) |
| *G10L 21/0216* | (2013.01) |

(52) U.S. Cl.
CPC .......... *G10L 21/0232* (2013.01); *H04R 1/403* (2013.01); *H04R 1/406* (2013.01); *H04R 3/005* (2013.01); *H04R 3/12* (2013.01); *G10L 2021/02082* (2013.01); *G10L 2021/02166* (2013.01)

(58) Field of Classification Search
CPC ....... G10L 21/0232; G10L 2021/02082; G10L 2021/02166; H04R 1/403; H04R 1/406; H04R 3/005; H04R 3/12
USPC ........................... 381/66, 63, 61, 71.11, 71.1
See application file for complete search history.

(56) References Cited

U.S. PATENT DOCUMENTS

| | | | | |
|---|---|---|---|---|
| 4,578,543 | A * | 3/1986 | Le Bourlot | H04B 3/23 379/406.08 |
| 5,371,789 | A * | 12/1994 | Hirano | H04M 9/082 370/290 |
| 6,665,409 | B1 * | 12/2003 | Rao | G10K 15/12 381/307 |
| 7,925,008 | B2 * | 4/2011 | Hirai | H04R 3/02 379/286 |
| 8,605,890 | B2 * | 12/2013 | Zhang | H04M 9/082 379/406.08 |
| 9,967,661 | B1 * | 5/2018 | Hilmes | G10L 21/0272 |
| 10,229,698 | B1 * | 3/2019 | Chhetri | G10L 21/0208 |

(Continued)

*Primary Examiner* — Vivian C Chin
*Assistant Examiner* — Con P Tran
(74) *Attorney, Agent, or Firm* — Pierce Atwood, LLP

(57) ABSTRACT

A system configured to perform echo cancellation using a reduced number of reference signals. The system may perform multi-channel acoustic echo cancellation (MCAEC) processing on a first portion of a microphone audio signal that corresponds to early reflections and may perform single-channel acoustic echo cancellation (AEC) processing on a second portion of the microphone audio signal that corresponds to late reverberations. For example, the system may use MCAEC processing on a plurality of reference audio signals to generate a first echo estimate signal and may subtract the first echo estimate signal from the microphone audio signal to generate a residual audio signal. The system may delay the first echo estimate signal, perform the AEC processing to generate a second echo estimate signal, and subtract the second echo estimate signal from the residual audio signal to generate an output audio signal. This reduces an overall complexity associated with performing echo cancellation.

20 Claims, 12 Drawing Sheets

(56) References Cited

U.S. PATENT DOCUMENTS

| | | | | |
|---|---|---|---|---|
| 2006/0153360 A1* | 7/2006 | Kellermann | .......... | H04M 9/082 379/406.08 |
| 2015/0371655 A1* | 12/2015 | Gao | .................. | G10L 21/0208 704/226 |
| 2019/0349471 A1* | 11/2019 | Ferguson | .............. | H04M 3/002 |
| 2020/0051581 A1* | 2/2020 | Luis Valero | ............. | H04R 3/02 |

* cited by examiner

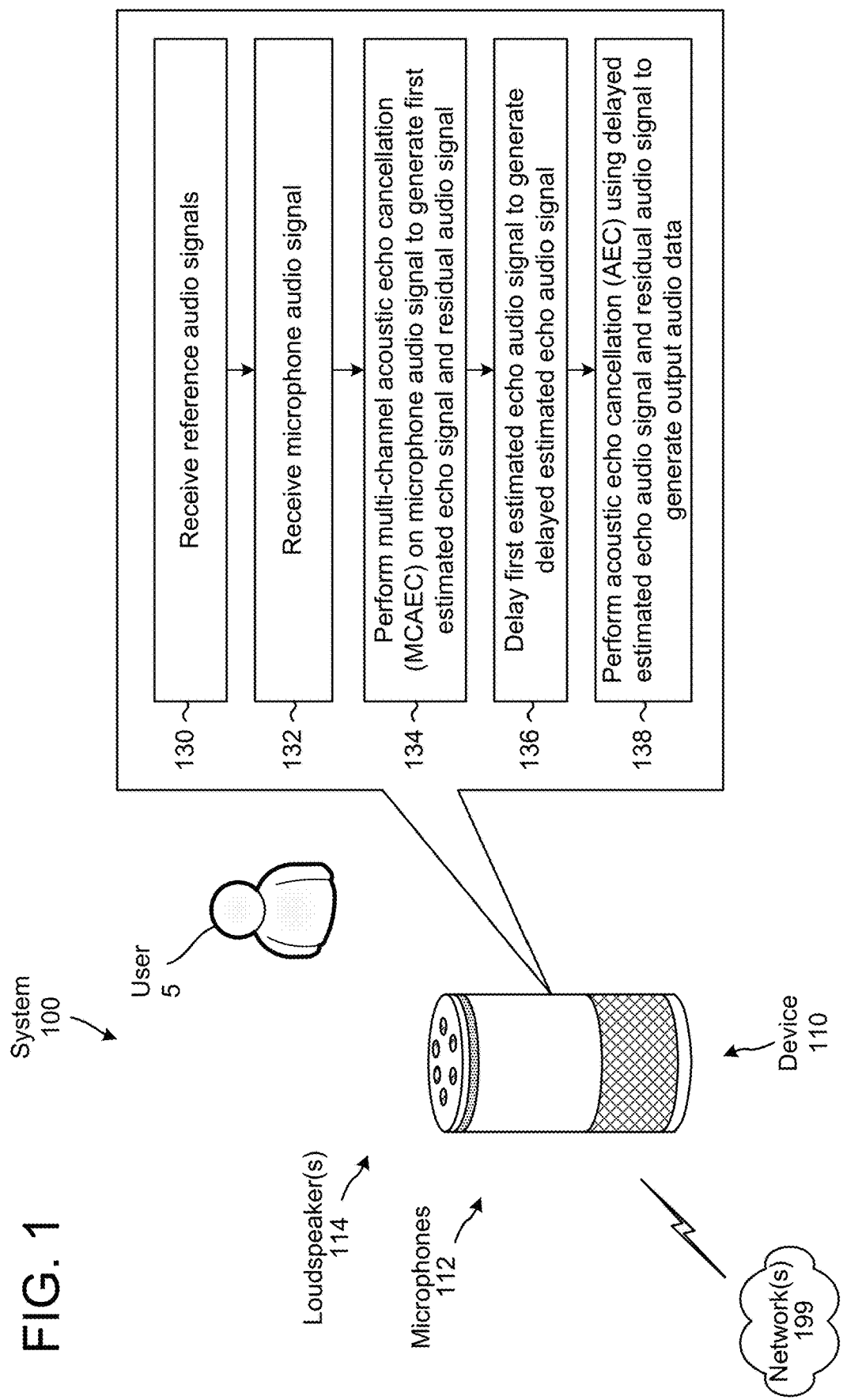

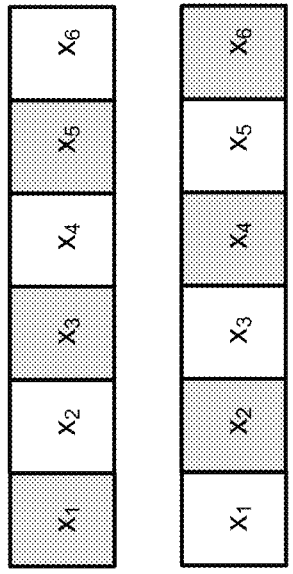
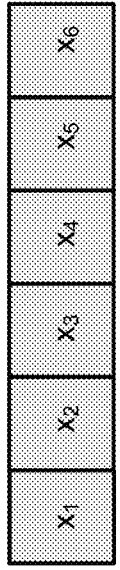
FIG. 5

FIG. 11

MCAEC 820

| | Samples | | Reference Channels | | Input Channels | | Total Multiplications |
|---|---|---|---|---|---|---|---|
| Normal Processing 1110 | 2048 | × | 5 | × | 6 | = | 61440 |
| RRC Processing 1120 | 2048 | × | 5 | × | 1 | = | 20480 |
| | | | | | 1 Anchor Channel | | |
| RRC Processing 1130 | 2048 | × | 5 | × | 1 | = | 22528 |
| | | | | | 1 Anchor Channel | | |

+

AEC 840

| | Samples | | Input Channels |
|---|---|---|---|
| | 2048 | × | 5 |
| | | | 5 Microphone Channels |
| | 2048 | × | 6 |
| | | | 6 Microphone Channels |

MCAEC 1020

| | Samples | | Reference Channels | | Input Channels | | |
|---|---|---|---|---|---|---|---|
| RRC Processing 1140 | 2048 | × | 5 | × | 2 | = | 45056 |
| RRC Processing 1150 | 2048 | × | 5 | × | 2 | = | 32768 |
| | | | | | 2 Anchor Channels | | |

+

MCAEC 1050

| | Samples | | Reference Channels | | Input Channels |
|---|---|---|---|---|---|
| | 2048 | × | 2 | × | 6 |
| | 2048 | × | 1 | × | 6 |
| | | | | | 6 Microphone Channels |

REDUCED REFERENCE CANCELLER

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIG. 5 illustrates examples of adapting filter coefficients according to embodiments of the present disclosure.

FIG. 11 illustrates examples of reduced complexity associated with applying reduced reference cancellation according to embodiments of the present disclosure.

DETAILED DESCRIPTION

Figure 2A:
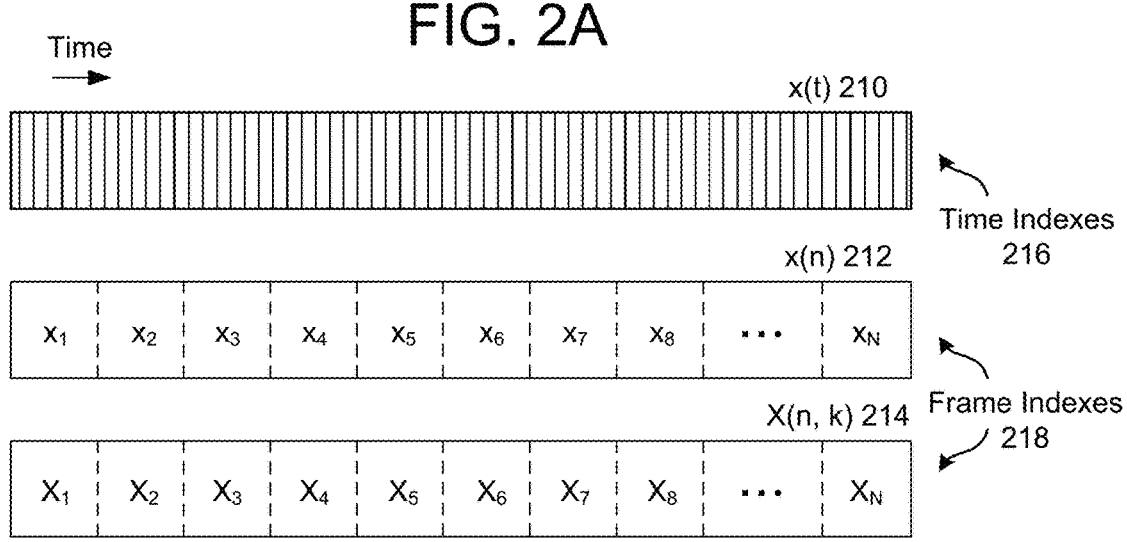
FIGS. 2A-2C illustrate examples of frame indexes, tone indexes, and channel indexes.

Electronic devices may be used to capture and process audio data. The audio data may be used for voice commands and/or may be output by loudspeakers as part of a communication session. In some examples, loudspeakers may generate audio using playback audio data while a microphone generates local audio data. An electronic device may perform audio processing, such as acoustic echo cancellation (AEC), to remove an "echo" signal corresponding to the playback audio data from the local audio data, isolating local speech to be used for voice commands and/or the communication session.

In some examples, the device may perform multi-channel echo cancellation processing to remove one or more reference signals from one or more microphone signals. However, as the number of reference signals and/or the number of microphone signals increases, a complexity of performing echo cancellation also increases.

To improve multi-channel acoustic echo cancellation (MCAEC), devices, systems and methods are disclosed that perform reduced reference cancellation processing to reduce a complexity and computational requirement of echo cancellation. The system may capture a microphone audio signal and may perform MCAEC processing on a first portion of the microphone audio signal that corresponds to early reflections and may perform AEC processing on a second portion of the microphone audio signal that corresponds to late reverberations. For example, the system may use MCAEC processing on a plurality of reference audio signals to generate a first echo estimate signal and may then subtract the first echo estimate signal from the microphone audio signal to generate a residual audio signal. The first echo estimate signal may correspond to an estimate of a first portion (e.g., early reflections) of an echo signal (e.g., recaptured playback audio data) received by the microphone. The system may delay the first echo estimate signal and perform acoustic echo cancellation (AEC) to generate a second echo estimate signal and may then subtract the second echo estimate signal from the residual audio signal to generate an output audio signal. Thus, the system may reduce an overall complexity associated with performing echo cancellation by reducing a number of reference signals for the second portion of the microphone audio data.

FIG. 1 illustrates a system configured to perform reduced reference cancellation processing according to embodiments of the present disclosure. For example, the system 100 may be configured to receive or generate microphone audio signals and perform echo cancellation to generate an output audio signal representing desired speech. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include microphones 112 in a microphone array and/or two or more loudspeakers 114. However, the disclosure is not limited thereto and the device 110 may include additional components without departing from the disclosure. While FIG. 1 illustrates the loudspeakers 114 being internal to the device 110, the disclosure is not limited thereto and the loudspeakers 114 may be external to the device 110 without departing from the disclosure. For example, the loudspeakers 114 may be separate from the device 110 and connected to the device 110 via a wired connection and/or a wireless connection without departing from the disclosure.

The device 110 may be an electronic device configured to send audio data to and/or receive audio data. For example, the device 110 (e.g., local device) may receive playback audio data $x_r(t)$ (e.g., far-end reference audio data) from a remote device and the playback audio data $x_r(t)$ may include remote speech, music, and/or other output audio. In some examples, the user 5 may be listening to music or a program and the playback audio data $x_r(t)$ may include the music or other output audio (e.g., talk-radio, audio corresponding to a broadcast, text-to-speech output, etc.). However, the disclosure is not limited thereto and in other examples the user 5 may be involved in a communication session (e.g., conversation between the user 5 and a remote user local to the remote device) and the playback audio data $x_r(t)$ may include remote speech originating at the remote device. In both examples, the device 110 may generate output audio corresponding to the playback audio data $x_r(t)$ using the two or more loudspeakers 114. While generating the output audio, the device 110 may capture microphone audio data $x_m(t)$ (e.g., input audio data) using the microphones 112. In addition to capturing desired speech (e.g., the microphone audio data includes a representation of local speech from a user 5), the device 110 may capture a portion of the output audio generated by the loudspeakers 114 (including a portion of the music and/or remote speech), which may be referred to as an "echo" or echo signal, along with additional acoustic noise (e.g., undesired speech, ambient acoustic noise in an environment around the device 110, etc.), as discussed in greater detail below.

In some examples, the microphone audio data $x_m(t)$ may include a voice command directed to a remote system, which may be indicated by a keyword (e.g., wakeword). For example, the device 110 detect that the wakeword is represented in the microphone audio data $x_m(t)$ and may send the microphone audio data $x_m(t)$ to the remote system. Thus, the remote system may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the remote system may perform Automatic Speech Recognition (ASR) processing, Natural Language Understanding (NLU) processing and/or command processing. The voice commands may control the device 110, audio devices (e.g., play music over loudspeakers 114, capture audio using microphones 112, or the like), multimedia devices (e.g., play videos using a display, such as a television, computer, tablet or the like), smart home devices (e.g., change temperature controls, turn on/off lights, lock/unlock doors, etc.) or the like.

Additionally or alternatively, in some examples the device 110 may send the microphone audio data $x_m(t)$ to the remote device as part of a Voice over Internet Protocol (VoIP) communication session or the like. For example, the device 110 may send the microphone audio data $x_m(t)$ to the remote device either directly or via remote system and may receive the playback audio data $x_r(t)$ from the remote device either directly or via the remote system. During the communication session, the device 110 may also detect the keyword (e.g., wakeword) represented in the microphone audio data $x_m(t)$ and send a portion of the microphone audio data $x_m(t)$ to the remote system in order for the remote system to determine a voice command.

Prior to sending the microphone audio data $x_m(t)$ to the remote device/remote system, the device 110 may perform audio processing to isolate local speech captured by the microphones 112 and/or to suppress unwanted audio data (e.g., echoes and/or noise). For example, the device 110 may perform acoustic echo cancellation (AEC) to isolate speech or other desired input audio. Additionally or alternatively, the device 110 may perform beamforming (e.g., operate microphones 112 using beamforming techniques), adaptive interference cancellation (AIC), residual echo suppression (RES), and/or other audio processing without departing from the disclosure.

To reduce a complexity and/or computational processing requirement associated with performing AEC processing, the device 110 may include a reduced reference canceller (RRC) component that performs first AEC processing for early reflections using a number of reference signals and performs second AEC processing for late reverberations using a single reference signal. For example, the RRC component may include a multi-channel acoustic echo canceller (MCAEC) component to perform first echo cancellation on the early reflections (e.g., first portion of an overall tail length for the RRC processing) and a one-channel acoustic echo canceller (AEC) component to perform second echo cancellation on the late reverberations (e.g., second portion of the overall tail length).

As described in greater detail below, the MCAEC component may perform the first echo cancellation using multiple reference signals, whereas the AEC component may perform the second echo cancellation using a single reference signal. Thus, a first complexity of performing the first echo cancellation remains the same for the MCAEC component, but a second complexity of performing the second echo cancellation for the AEC component is reduced to 1/N relative to traditional MCAEC processing. To illustrate an example when the reference audio data includes five channels, because the AEC component performs echo cancellation using only a single reference signal, the device 110 may reduce a complexity associated with the second echo cancellation to ⅕ or 20% (e.g., 1024×1=1024 taps are required instead of 1024×5=5120 taps).

As illustrated in FIG. 1, the device 110 may receive (130) reference audio signals corresponding to the playback audio data. For example, the device 110 may receive five separate channels corresponding to five loudspeakers 114a-114e, although the disclosure is not limited thereto. The device 110 may also receive (132) a microphone audio signal from a microphone 112 of the device 110. While FIG. 1 illustrates the device 110 receiving a single microphone audio signal, the disclosure is not limited thereto and the steps illustrated in FIG. 1 may be applied to multiple microphone audio signals without departing from the disclosure.

The device 110 may perform (134) multi-channel acoustic echo cancellation (MCAEC) processing on the microphone audio signal to generate a first estimated echo signal (e.g., first echo estimate signal) and a residual audio signal. For example, the device 110 may perform MCAEC processing using the reference audio signals to generate the first estimated echo signal corresponding to an estimate of a first portion (e.g., early reflections) of the echo signal $y(t)$ received by the microphone 112. The device 110 may then subtract the first estimated echo signal from the microphone audio signal to generate the residual audio signal. Thus, the MCAEC processing may remove and/or reduce portions of the echo signal that correspond to the early reflections.

As will be described in greater detail below, the MCAEC processing may be performed using a first tail length that is smaller than an overall tail length used to perform echo cancellation. For example, an overall tail length may correspond to a first number of taps (e.g., 2048 taps) and the first tail length may correspond to a fraction of the first number of taps (e.g., 1024 taps), although the disclosure is not limited thereto. Thus, the MCAEC only performs multi-channel echo cancellation using multiple reference audio signals for a fraction of the total tail length. For ease of illustration, the tail length may be described with reference to a number of taps. However, the disclosure is not limited thereto, and the tail length may correspond to a duration of time (e.g., milliseconds) without departing from the disclosure.

To reduce a complexity of performing echo cancellation, the device 110 may use the first estimated echo signal as an approximation of the late reverberations. As illustrated in FIG. 1, the device 110 may delay (136) the first estimated echo audio signal to generate a delayed estimated echo audio signal. For example, the device 110 may delay the first estimated echo signal based on the first tail length (e.g., 1024 taps), so that the delayed estimated echo audio signal is correlated with an echo estimate for late reverberations. While the delayed estimated echo signal is not as detailed as the reference audio signals, it may provide an approximation (e.g., an adequate summary) of the reference audio signals, reducing the complexity of performing echo cancellation without significantly affecting a quality of the output audio signal (e.g., increasing distortion).

The device 110 may perform (138) acoustic echo cancellation (AEC) on the delayed estimated echo audio signal and the residual audio signal to generate an output audio signal. For example, the device 110 may use the delayed estimated echo audio signal to generate a second estimated echo signal corresponding to an estimate of a second portion (e.g., late reverberations) of the echo signal y(t) received by the microphone 112. The device 110 may then subtract the second estimated echo signal from the residual audio signal to generate the output audio signal.

In the example described above, the AEC processing may be performed using a second tail length that is equal to the first tail length (e.g., 1024 taps), so that the MCAEC processing is performed on a first half of the overall tail length and the AEC processing is performed on a second half of the overall tail length. However, the disclosure is not limited thereto, and the first tail length and/or the second tail length may vary without departing from the disclosure. For example, the MCAEC processing may be performed using a first tail length equal to ¼ of the overall tail length (e.g., 512 taps) and the AEC processing may be performed using a second tail length equal to ¾ of the overall tail length (e.g., 1536 taps) without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) interchangeably without departing from the disclosure. For example, some audio data may be referred to as playback audio data $x_r(t)$, microphone audio data $x_m(t)$, error audio data m(t), output audio data r(t), and/or the like. Additionally or alternatively, this audio data may be referred to as audio signals such as a playback signal $x_r(t)$, microphone signal $x_m(t)$, error signal m(t), output audio data r(t), and/or the like without departing from the disclosure.

Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, audio data may be captured by the microphones 112 in the time-domain. However, the device 110 may convert the audio data to the frequency-domain or subband-domain in order to perform beamforming, aligned beam merger (ABM) processing, acoustic echo cancellation (AEC) processing, and/or additional audio processing without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

As used herein, a frequency band corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Playback audio data $x_r(t)$ (e.g., far-end reference signal) corresponds to audio data that will be output by the loudspeakers 114 to generate playback audio (e.g., echo signal y(t)). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphones 112 prior to the device 110 performing audio processing such as AEC processing or beamforming. The microphone audio data $x_m(t)$ may include local speech s(t) (e.g., an utterance, such as near-end speech generated by the user 5), an "echo" signal y(t) (e.g., portion of the playback audio $x_r(t)$ captured by the microphones 112), acoustic noise n(t) (e.g., ambient noise in an environment around the device 110), and/or the like. As the microphone audio data is captured by the microphones 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal y(t) corresponds to a portion of the playback audio that reaches the microphones 112 (e.g., portion of audible sound(s) output by the loudspeakers 114 that is recaptured by the microphones 112) and may be referred to as an echo or echo data y(t).

Isolated audio data corresponds to audio data after the device 110 performs echo cancellation processing to isolate the local speech s(t). For example, isolated audio data corresponds to the microphone audio data $x_m(t)$ after subtracting the reference signal(s) (e.g., using AEC processing). As noted above, the isolated audio data may be referred to as isolated audio signal(s) without departing from the disclosure, and one of skill in the art will recognize that audio data output by an AEC component may also be referred to as an error audio data e(t), error signal e(t) and/or the like.

Figure 2B:
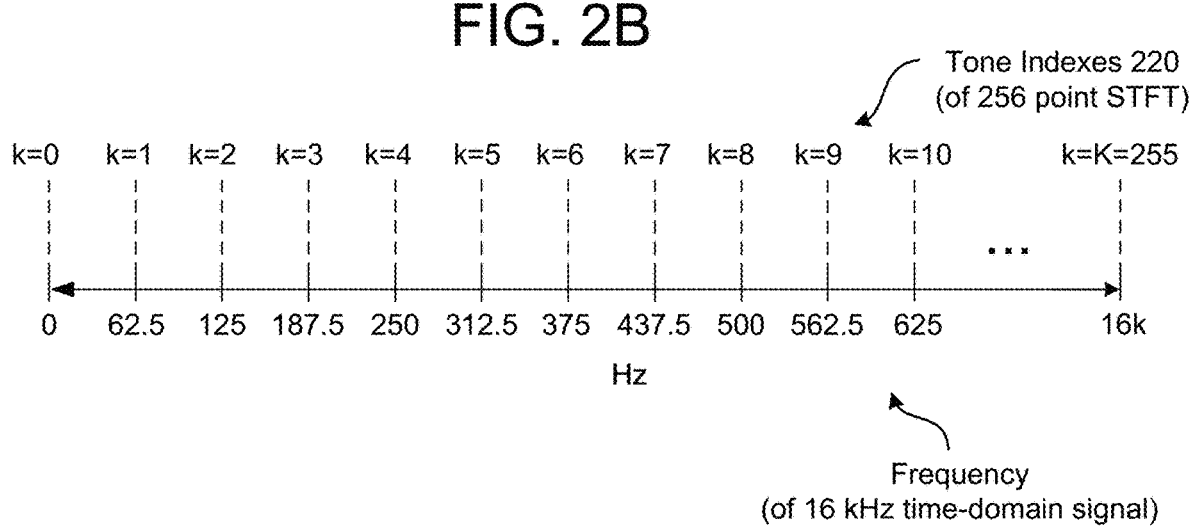
Figure 2C:
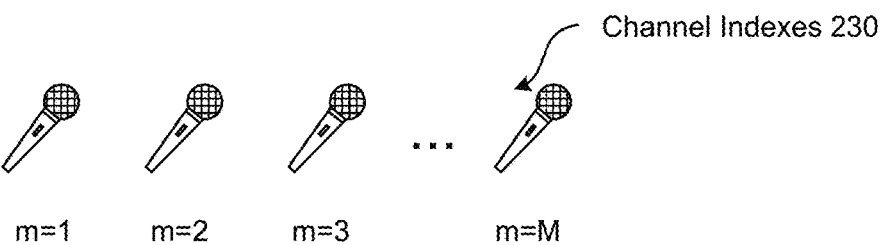

FIGS. 2A-2C illustrate examples of frame indexes, tone indexes, and channel indexes. As described above, the device 110 may generate microphone audio data $x_m(t)$ using microphones 112. For example, a first microphone 112a may generate first microphone audio data $x_{m1}(t)$ in a time domain, a second microphone 112b may generate second microphone audio data $x_{m2}(t)$ in the time domain, and so on. As illustrated in FIG. 2A, a time domain signal may be represented as microphone audio data x(t) 210, which is comprised of a sequence of individual samples of audio data. Thus, x(t) denotes an individual sample that is associated with a time t.

While the microphone audio data x(t) 210 is comprised of a plurality of samples, in some examples the device 110 may group a plurality of samples and process them together. As illustrated in FIG. 2A, the device 110 may group a number of samples together in a frame to generate microphone audio data x(n) 212. As used herein, a variable x(n) corresponds to the time-domain signal and identifies an individual frame (e.g., fixed number of samples s) associated with a frame index n.

Additionally or alternatively, the device 110 may convert microphone audio data x(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) 214 in the frequency domain or the subband domain. As used herein, a variable X(n, k) corresponds to the frequency-domain signal and identifies an individual frame associated with frame index n and tone index k. As illustrated in FIG. 2A, the microphone audio data x(t) 212 corresponds to time indexes 216, whereas the microphone audio data x(n) 212 and the microphone audio data X(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data x(t) 210) and frame indexes 218 (e.g., microphone audio data x(n) 212 in the time domain and microphone audio data X(n, k) 216 in the frequency domain). For example, the system 100 may apply FFT processing to the time-domain microphone audio data x(n) 212, producing the frequency-domain microphone audio data X(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 72B illustrates the frequency range being divided into 256 different subbands (e.g., tone indexes), the disclosure is not limited thereto and the system 100 may divide the frequency range into K different subbands (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

The system 100 may include multiple microphones 112, with a first channel m corresponding to a first microphone 112a, a second channel (m+1) corresponding to a second microphone 112b, and so on until a final channel (MP) that corresponds to microphone 112M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

While FIGS. 2A-2C are described with reference to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, the device 110 may first perform time-alignment to align the playback audio data $x_r(n)$ with the microphone audio data $x_m(n)$. For example, due to nonlinearities and variable delays associated with sending the playback audio data $x_r(n)$ to the loudspeakers 114 using a wireless connection, the playback audio data $x_r(n)$ is not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeakers 114), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$ (e.g., adjust for propagation delay), may add/subtract samples and/or frames from the playback audio data $x_r(n)$ (e.g., adjust for drift), and/or the like. In some examples, the device 110 may modify both the microphone audio data and the playback audio data in order to synchronize the microphone audio data and the playback audio data. However, performing nonlinear modifications to the microphone audio data results in first microphone audio data associated with a first microphone to no longer be synchronized with second microphone audio data associated with a second microphone. Thus, the device 110 may instead modify only the playback audio data so that the playback audio data is synchronized with the first microphone audio data.

Figure 3:
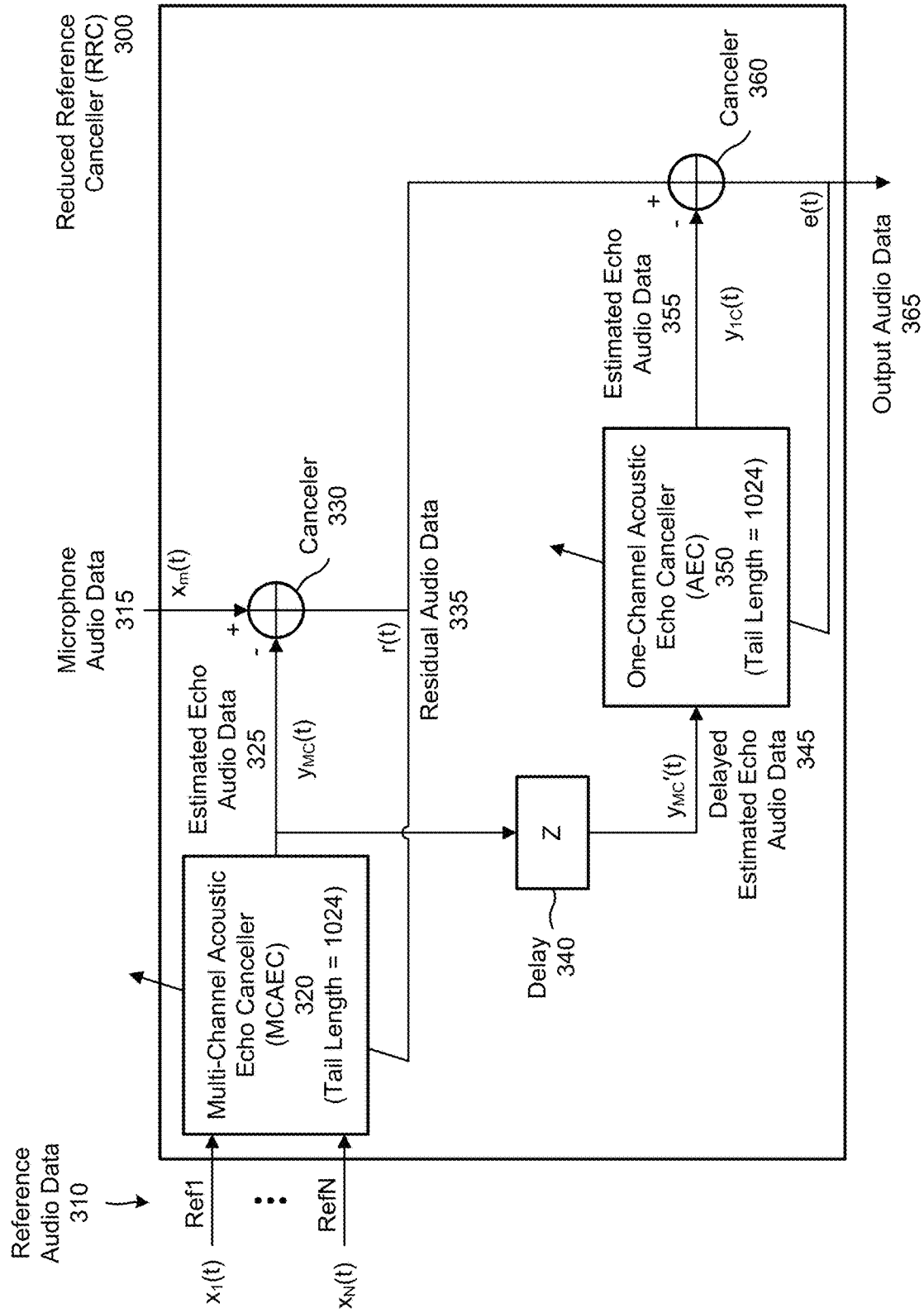
FIG. 3 illustrates an example component diagram for performing reduced reference cancellation according to embodiments of the present disclosure.

FIG. 3 illustrates an example component diagram for performing reduced reference cancellation according to embodiments of the present disclosure. As illustrated in FIG. 3, the device 110 may include a reduced reference canceller (RRC) 300 that may reduce a complexity of performing echo cancellation by processing early reflections using a first component and processing late reverberations using a second component. For example, the RRC 300 may include a multi-channel acoustic echo canceller (MCAEC) component 320 to perform echo cancellation on the early reflections (e.g., first portion of an overall tail length for the RRC 300) and a one-channel acoustic echo canceller (AEC) component 350 to perform echo cancellation on the late reverberations (e.g., second portion of the overall tail length).

As illustrated in FIG. 3, the MCAEC component 320 may perform echo cancellation using multiple reference signals, whereas the AEC component 350 performs echo cancellation using a single reference signal. Thus, a first complexity of performing echo cancellation remains the same for the MCAEC component 320 (e.g., first portion of the overall tail length) but a second complexity of performing echo cancellation for the AEC component 350 (e.g., second portion of the overall tail length) is reduced to 1/N relative to performing traditional MCAEC processing. To illustrate an example when the reference audio data 310 includes five channels, because the AEC component 350 performs echo cancellation using only a single reference signal, the device 110 may reduce a complexity associated with the second portion of the overall tail length to ⅕ or 20% (e.g., 1024×1=1024 taps are required instead of 1024×5=5120 taps).

As illustrated in FIG. 3, the MCAEC component 320 may receive reference audio data $x_r(t)$ 310 comprising N different reference signals (e.g., first reference Ref1 $x_1(t)$, second reference Ref2 $x_2(t)$, and so on until N-th reference RefN $x_N(t)$) and may generate estimated echo audio data $y_r(t)$ 325 (e.g., first echo estimate signal) corresponding to an estimate of a first portion (e.g., early reflections) of the echo signal $y(t)$ received by the microphone 112. For example, the MCAEC component 320 may include MCAEC adaptive filter coefficients and the MCAEC component 320 may perform adaptation to update (e.g., adapt) MCAEC filter coefficient values. The MCAEC component 320 may include one MCAEC filter coefficient value for each reference signal and each frequency band ω, although the disclosure is not limited thereto. Using the MCAEC filter coefficient values, the MCAEC component 320 may generate the estimated echo audio data 325 by multiplying each individual MCAEC filter coefficient value by a corresponding portion of a respective reference signal. For example, a first MCAEC filter coefficient value may be associated with a first portion of the first reference signal Ref1 $x_1(t)$ that is within a first frequency band $\omega_1$, a second MCAEC filter coefficient value may be associated with a second portion of the first reference signal Ref1 $x_1(t)$ that is within a second frequency band $\omega_2$, a third MCAEC filter coefficient value may be associated with a first portion of the second reference signal Ref2 $x_2(t)$ that is within the first frequency band $\omega_1$, and so on.

An individual microphone 112 may generate microphone audio data $x_m(t)$ 315 and a canceler component 330 may subtract the estimated echo audio data $y_r(t)$ 325 from the microphone audio data $x_m(t)$ 315 to generate residual audio data $r(t)$ 335. Thus, the device 110 may perform echo cancellation to remove the estimated echo from the microphone audio data 315 and generate the residual audio data $r(t)$ 335. While FIG. 3 illustrates the canceler component 330 separate from the MCAEC component 320, the disclosure is not limited thereto and the MCAEC component 320 may include the canceler component 330 without departing from the disclosure.

As described above, the MCAEC component 320 may have a first tail length that is only a portion of the overall tail length for the RRC component 300. For example, FIG. 3 illustrates an example in which the overall tail length for the RRC component 300 is a first number of taps (e.g., 2048 taps) and the first tail length is only half of the first number of taps (e.g., 1024 taps). Thus, the AEC component 350 has a second tail length that is equal to half of the first number of taps (e.g., 1024 taps). However, the disclosure is not limited thereto, and the first tail length and/or the second tail length may vary without departing from the disclosure. For example, the MCAEC component 320 may have a tail length equal to ¼ of the overall tail length (e.g., 512 taps) and the AEC component 350 may have a tail length equal to ¾ of the overall tail length (e.g., 1536 taps) without departing from the disclosure.

To reduce the complexity associated with performing echo cancellation on the late reverberations, the device 110 may input the estimated echo audio data $y_{MC}(t)$ 325 to the AEC component 350 after an appropriate delay. For example, a delay component 340 may delay the estimated echo audio data $y_{MC}(t)$ 325 based on the first tail length (e.g., 1024 taps) to generate delayed estimated echo audio data $y_{MC}'(t)$ 345, which is input to the AEC component 350. While the delayed estimated echo audio data $y_{MC}'(t)$ 345 is not as detailed as the reference audio data 310, it may provide an approximation (e.g., an adequate summary) of the reference audio data 310, reducing the complexity of performing echo cancellation without significantly affecting a quality of the output audio data (e.g., increasing distortion).

When operating in the time domain, the delay component 340 illustrated in FIG. 3 may delay the estimated echo audio data $y_{MC}(t)$ 325 based on the first tail length (e.g., 1024), which may be represented as $Z^{1024}$. In contrast, in some examples the device 110 may process audio data in a frequency domain. When operating in the frequency domain, the delay component 340 may delay based on the first tail length (e.g., 1024) divided by the number of samples used in the Fast Fourier Transform (FFT) processing, which may be represented as $Z^{1024/D}$, although the disclosure is not limited thereto.

As illustrated in FIG. 3, the AEC component 350 may receive the delayed estimated echo audio data $y_{MC}'(t)$ 345 and may generate estimated echo audio data $y_{1C}(t)$ 355 (e.g., second echo estimate signal) corresponding to an estimate of a second portion (e.g., late reverberations) of the echo signal y(t) received by the microphone 112. For example, the AEC component 350 may include AEC adaptive filter coefficients and the AEC component 350 may perform adaptation to update (e.g., adapt) AEC filter coefficient values. The AEC component 350 may include one AEC filter coefficient value for each frequency band ω, although the disclosure is not limited thereto. Using the AEC filter coefficient values, the AEC component 350 may generate the estimated echo audio data $y_{1C}(t)$ 355 by multiplying each individual AEC filter coefficient value by a corresponding portion of the delayed estimated echo audio data $y_{MC}'(t)$ 345. For example, a first AEC filter coefficient value may be associated with a first portion of the delayed estimated echo audio data $y_{MC}'(t)$ 345 that is within a first frequency band $\omega_1$, a second AEC filter coefficient value may be associated with a second portion of the delayed estimated echo audio data $y_{MC}'(t)$ 345 that is within a second frequency band $\omega_2$, and so on.

A canceler component 360 may subtract the estimated echo audio data $y_{1C}(t)$ 355 from the residual audio data r(t) 335 to generate output audio data e(t) 365. Thus, the device 110 may perform echo cancellation to remove the estimated echo from the residual audio data r(t) 335 and generate the output audio data e(t) 365. While FIG. 3 illustrates the canceler component 360 separate from the AEC component 350, the disclosure is not limited thereto and the AEC component 350 may include the canceler component 360 without departing from the disclosure.

Figure 4:
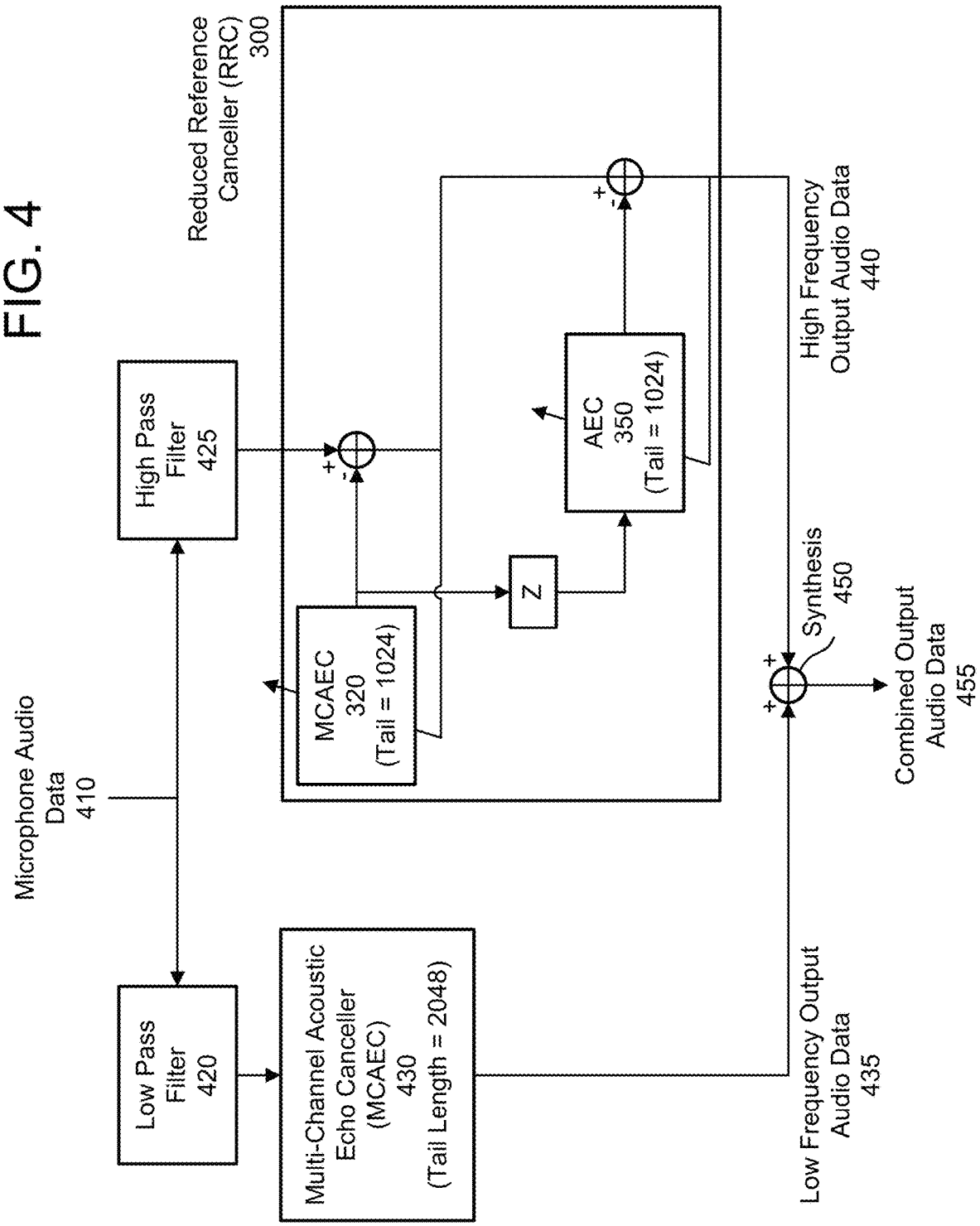
FIG. 4 illustrates an example component diagram for performing reduced reference cancellation for specific frequency bands according to embodiments of the present disclosure.

FIG. 4 illustrates an example component diagram for performing reduced reference cancellation for specific frequency bands according to embodiments of the present disclosure. In some examples, the device 110 may perform normal MCAEC processing on a first portion of the microphone audio data (e.g., first frequency range below a cutoff frequency value, such as 1000 Hz) and may perform reduced reference cancellation processing on a second portion of the microphone audio data (e.g., second frequency range above the cutoff frequency value). This may reduce an amount of distortion represented in the first frequency range while benefiting from the reduction in complexity when processing the second frequency range.

As illustrated in FIG. 4, the device 110 may include a low pass filter component 420 and a high pass filter component 425 to separate the microphone audio data 410 for processing. For example, the low pass filter component 420 may apply a low pass filter to the microphone audio data 410 to select a first portion of the microphone audio data 410 that is within the first frequency range (e.g., below 1000 Hz) and may output the first portion of the microphone audio data 410 to a MCAEC component 430. In some examples, the low pass filter component 420 may generate first audio data corresponding to the first portion of the microphone audio data 410, although the disclosure is not limited thereto. The MCAEC component 430 may perform normal echo cancellation (e.g., using a first tail length of 2048 taps) and generate low frequency output audio data 435.

As illustrated in FIG. 4, the high pass filter component 425 may apply a high pass filter to the microphone audio data 410 to select a second portion of the microphone audio data 410 that is within the second frequency range (e.g., above 1000 Hz) and may output the second portion of the microphone audio data 410 to the RRC component 300. In some examples, the high pass filter component 425 may generate second audio data corresponding to the second portion of the microphone audio data 410, although the disclosure is not limited thereto. The RRC component 300 may perform reduced reference echo cancellation as described above to generate high frequency output audio data 440. For example, the RRC component 300 may include the MCAEC component 320 to perform echo cancellation on a first portion of the second audio data that corresponds to the early reflections (e.g., using a second tail length of 1024 taps), along with the AEC component 350 to perform echo cancellation on a second portion of the second audio data that corresponds to the late reverberations (e.g., using the second tail length of 1024). Thus, the RRC component 300 performs echo cancellation processing on the second audio data while reducing a complexity of the echo cancellation processing relative to the MCAEC component 430.

A synthesis component 450 may perform frequency synthesis to combine the low frequency output audio data 435 and the high frequency output audio data 440 to generate combined output audio data 455 that is associated with the first frequency range and the second frequency range.

While the examples described above refer to a specific frequency cutoff value (e.g., 1000 Hz), the disclosure is not limited thereto and the frequency cutoff value may vary without departing from the disclosure. Additionally or alternatively, while FIG. 4 illustrates the MCAEC component 430 processing the first audio data to generate the low frequency output audio data 435 and the RRC component 300 processing the second audio data to generate the high frequency output audio data 440, this is intended as an illustrative example and the disclosure is not limited thereto. Instead, the MCAEC component 430 may process the second audio data to generate the high frequency output audio data 440 and the RRC component 300 may process the first audio data to generate the low frequency output audio data 435 without departing from the disclosure.

FIG. 5 illustrates examples of adapting filter coefficients according to embodiments of the present disclosure. To further reduce a complexity or processing consumption required to perform echo cancellation, in some examples the device 110 may adapt first filter coefficients (e.g., first plurality of filter coefficient values) associated with the MCAEC component 320 and second filter coefficients (e.g., second plurality of filter coefficient values) associated with the AEC component 350 in a round-robin fashion (e.g., alternating between the two adaptive filters). For example, the device 110 may adapt the filter coefficients every other audio frame, such that the first filter coefficients are adapted every odd frame and the second filter coefficients are adapted every even frame.

This is illustrated in FIG. 5 as constant adaptation 510 (e.g., adapting both the first filter coefficients and the second filter coefficients every audio frame) and alternating adaptation 520 (e.g., adapting the first filter coefficients and the second filter coefficients every other audio frame), with an offset. For example, FIG. 5 illustrates the alternating adaptation 520 adapts the first filter coefficients associated with the MCAEC component 320 every odd audio frame, and adapts the second filter coefficients associated with the AEC component 350 every even audio frame. However, this is intended for illustrative purposes only, and the disclosure is not limited thereto.

Figure 6:
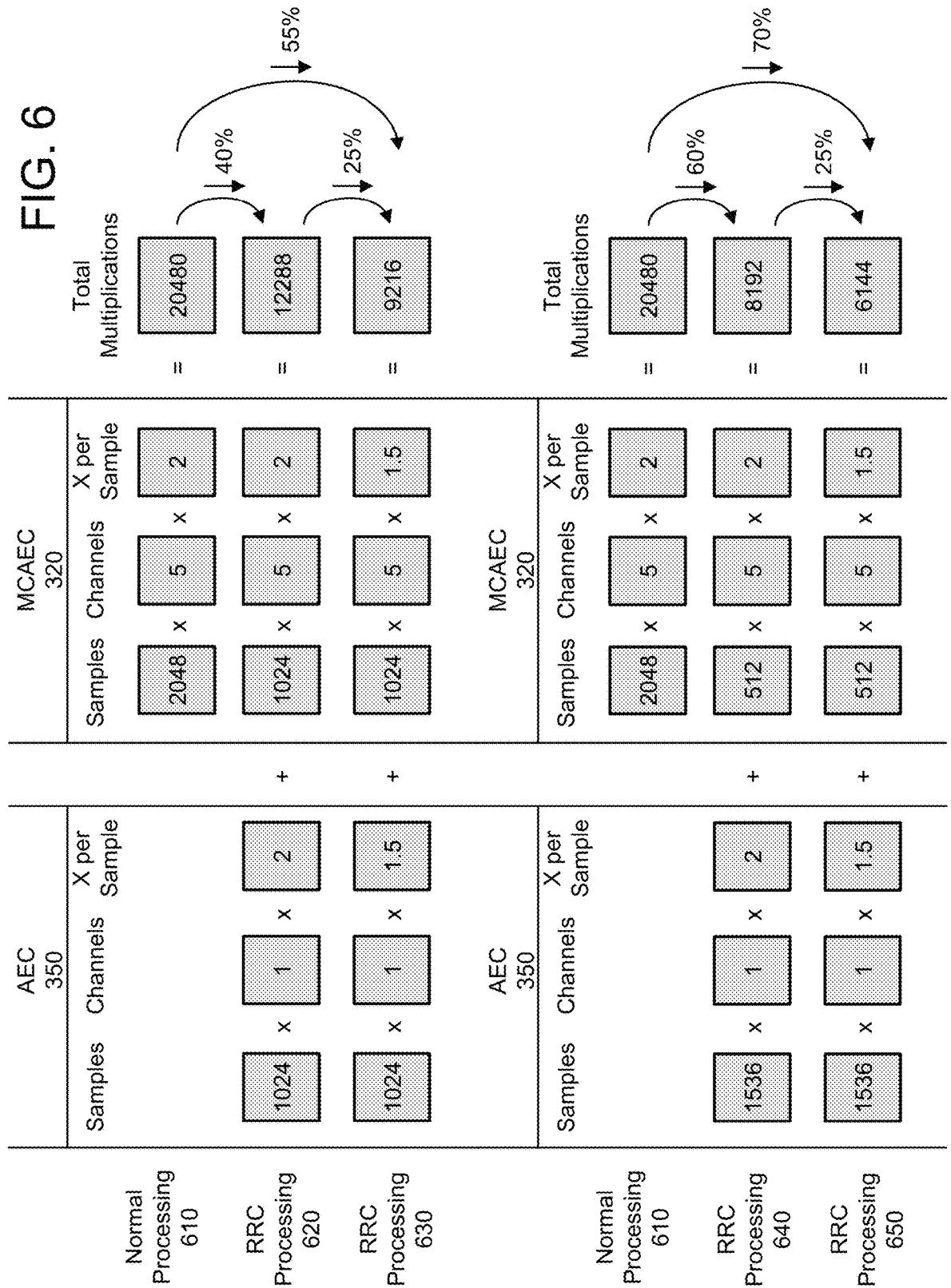
FIG. 6 illustrates examples of reduced complexity associated with applying reduced reference cancellation according to embodiments of the present disclosure.

FIG. 6 illustrates examples of reduced complexity associated with applying reduced reference cancellation according to embodiments of the present disclosure. As illustrated in FIG. 6, normal processing 610 (e.g., MCAEC processing for the entire overall tail length) for 2048 samples results in processing 20480 total multiplications (e.g., 2048 samples×5 channels×2 multiplications per sample=20480 total multiplications). For example, to process an individual audio sample, the device 110 may perform a first multiplication during adaptive filtering and a second multiplication during filter adaptation, resulting in two multiplications per sample.

In contrast, performing RRC processing 620 (e.g., MCAEC processing for a first tail length, AEC processing for a second tail length), as illustrated in FIG. 3, results in a 40% decrease in the total multiplications (relative to normal processing 610). For example, processing 1024 samples using the MCAEC component 320 and processing 1024 samples using the AEC component 350 results in processing 12288 total multiplications (e.g., 1024 samples×5 channels×2 multiplications per sample=10240 multiplications, 1024 samples×1 channel×2 multiplications per sample=2048 multiplications, and 10240+2048=12288 total multiplications).

Further, performing RRC processing 630 (e.g., AEC processing for the second tail length) while alternating adaptation 535 between the MCAEC and the AEC, as illustrated in FIG. 5, results in a 25% decrease in the total multiplications relative to RRC processing 620, or a 55% decrease in the total multiplications relative to normal processing 610. For example, during RRC processing 620 the device 110 may perform adaptive filtering and filter adaptation every audio sample, such that processing 1024 samples corresponds to 2048 multiplications (e.g., 1024 multiplications during adaptive filtering and 1024 multiplications during filter adaptation). In contrast, during RRC processing 630, the device 110 may perform adaptive filtering every audio sample and perform filter adaptation every other audio sample, such that processing 1024 samples corresponds to 1536 multiplications (e.g., 1024 multiplications during adaptive filtering, 512 multiplications during filter adaptation) or 1.5 multiplications per sample. Thus, performing RRC processing 630 results in processing 9216 total multiplications (e.g., 1024 samples×5 channels×1.5 multiplications per sample=7680 multiplications, 1024 samples×1 channel×1.5 multiplications per sample=1536 multiplications, and 7680+1536=9216 total multiplications).

The examples illustrated above correspond to the first tail length and the second tail length being equal (e.g., 50% split between the MCAEC processing and the AEC processing). However, the disclosure is not limited thereto and the first tail length and the second tail length may vary without departing from the disclosure. To illustrate an example, the first tail length may be equal to 512 samples and the second tail length may be equal to 1536 samples, such that the first tail length is ¼ the overall tail length and the second tail length is ¾ the overall tail length. As illustrated in FIG. 6, performing RRC processing 640 (e.g., MCAEC processing for 512 samples, AEC processing for 1536 samples) results in a 60% decrease in total multiplications relative to normal processing 610. For example, processing 512 samples using the MCAEC component 320 and processing 1536 samples using the AEC component 350 results in processing 8192 total multiplications (e.g., 512 samples×5 channels×2 multiplications per sample=5120 samples, 1536 samples×1 channel×2 multiplications per sample=3072 samples, and 5120+3072=8192 total samples).

Further, performing RRC processing 650 (e.g., MCAEC processing for 512 samples, AEC processing for 1536 samples) while alternating adaptation 535 between the MCAEC and the AEC results in a 25% decrease in the total multiplications relative to RRC processing 640, or a 70% decrease in the total multiplications relative to normal processing 610. For example, during RRC processing 640 the device 110 may perform adaptive filtering and filter adaptation every audio sample, such that processing 512 samples corresponds to 1024 multiplications (e.g., 512 multiplications during adaptive filtering, 512 multiplications during filter adaptation), or processing 1536 samples corresponds to 3072 multiplications (e.g., 1536 multiplications during adaptive filtering, 1536 multiplications during filter adaptation). In contrast, during RRC processing 650, the device 110 may perform adaptive filtering every audio sample and perform filter adaptation every other audio sample, such that processing 512 samples corresponds to 768 multiplications (e.g., 512 multiplications during adaptive filtering, 256 multiplications during filter adaptation) or processing 1536 samples corresponds to 2304 multiplications (e.g., 1536 multiplications during adaptive filtering, 768 multiplications during filter adaptation). Thus, performing RRC processing 650 results in processing 6144 total multiplications (e.g., 512 samples×5 channels×1.5 multiplications per sample=3840 samples, 1536 samples×1 channel×1.5 multiplications per sample=2304 samples, and 3840+2304=6144 total samples).

While FIG. 6 illustrates two different examples of varying the first tail length and the second tail length, the disclosure is not limited thereto and the first tail length and/or the second tail length may vary without departing from the disclosure. Additionally or alternatively, the device 110 may perform alternating adaptation differently without departing from the disclosure.

Figure 7:
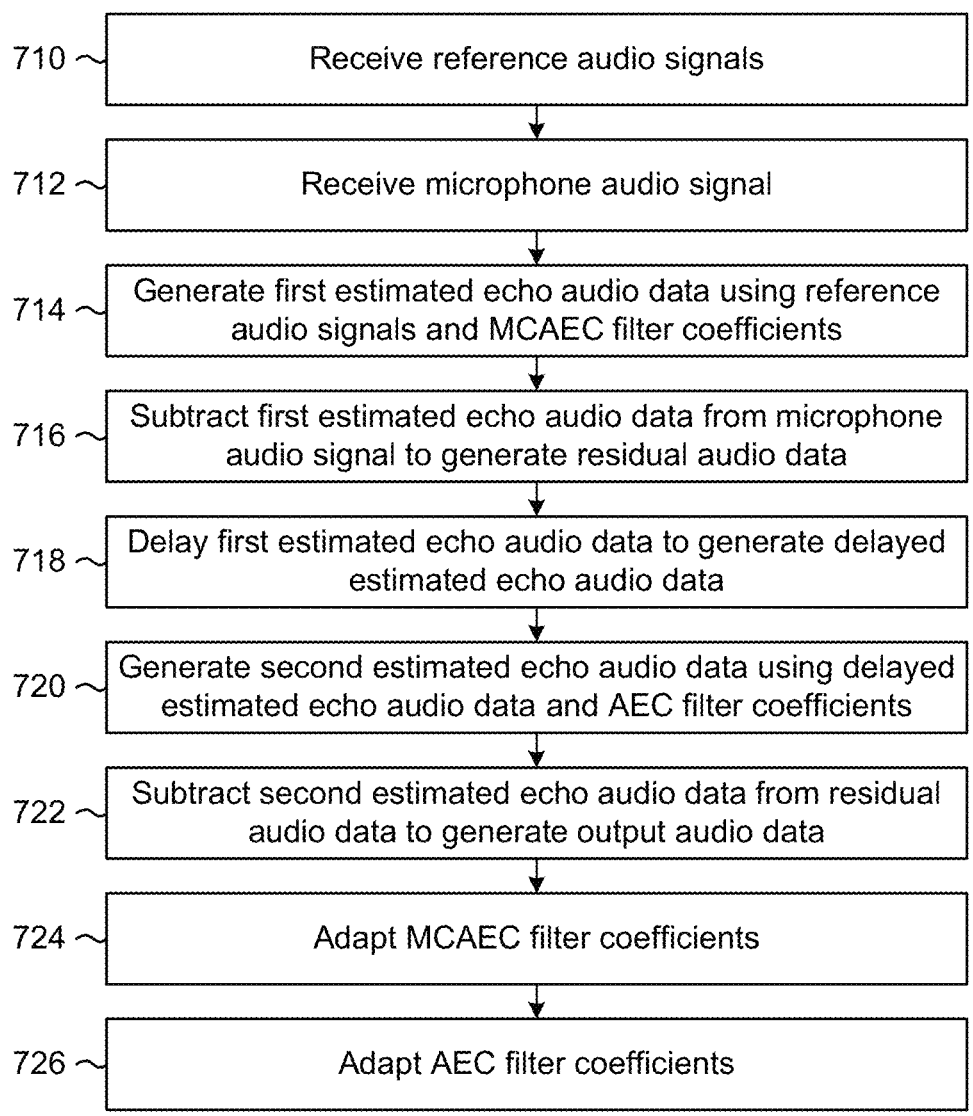
FIG. 7 is a flowchart conceptually illustrating an example method for performing reduced reference cancellation according to embodiments of the present disclosure.

FIG. 7 is a flowchart conceptually illustrating an example method for performing reduced reference cancellation according to embodiments of the present disclosure. As illustrated in FIG. 7, the device 110 may receive (710) reference audio signals corresponding to the loudspeakers 114, may receive (712) a microphone audio signal, may generate (714) first estimated echo audio data (e.g., first echo estimate signal) using the reference audio signals and multichannel acoustic echo cancelation (MCAEC) filter coefficients, and may subtract (716) the first estimated echo audio data from the microphone audio signal to generate residual audio data. For example, the device 110 may receive a plurality of reference audio signals, with an individual reference audio signal corresponding to each of the loudspeakers 114. For each individual reference audio signal, the device 110 may separate the reference audio signal into K frequency bands and multiply an individual frequency band by a MCAEC filter coefficient value (e.g., adaptive filter coefficient value) corresponding to the particular frequency band. For example, if the device 110 uses 256 separate frequency bands, the device 110 may multiply 256 portions of the reference audio data by 256 different MCAEC filter coefficient values to generate a portion of the first estimated echo audio data. The device 110 may then perform these steps for each of the reference audio signals and generate the first estimated echo audio data.

The first estimated echo audio data may correspond to early reflections of the output audio generated by the loudspeakers 114. By subtracting the first estimated echo audio data from the microphone audio signal, the device 110 may generate residual audio data that isolates local speech and removes the early reflections of the output audio.

The device 110 may then delay (718) the first estimated echo audio data to generate delayed estimated echo audio data, may generate (720) second estimated echo audio data (e.g., second echo estimate signal) using the delayed estimated echo audio data and AEC filter coefficients, and may subtract (722) the second estimated echo audio data from the residual audio data to generate output audio data. For example, the device 110 may delay the estimated echo audio data a duration of time corresponding to a tail length of the first stage of echo cancellation (e.g., MCAEC filter coefficients). The device 110 may then separate the delayed estimated echo audio data into K frequency bands and multiply an individual frequency band by an AEC filter coefficient value (e.g., adaptive filter coefficient value) corresponding to the particular frequency band. For example, if the device 110 uses 256 separate frequency bands, the device 110 may multiply 256 portions of the delayed estimated echo audio data by 256 different AEC filter coefficient values to generate the second estimated echo audio data.

Unlike the first estimated echo audio data, the second estimated echo audio data corresponds to a single reference signal (e.g., delayed estimated echo audio data). Thus, instead of N×K filter coefficient values (e.g., N reference signals and K frequency bands), the second state (e.g., single-channel AEC component) echo cancellation may only include K filter coefficient values. The second estimated echo audio data may correspond to late reverberations of the output audio generated by the loudspeakers 114. By subtracting the second estimated echo audio data from the residual audio data, the device 110 may generate the output audio data that further isolates the local speech and removes the late reverberations of the output audio.

The device 110 may then adapt (724) the MCAEC filter coefficients (e.g., adaptive filter coefficient values corresponding to the first stage of echo cancellation) using the residual audio data and may adapt (726) the AEC filter coefficients (e.g., adaptive filter coefficient values corresponding to the second stage of echo cancellation) using the output audio data. Thus, the device 110 may separately adapt the MCAEC filter coefficient values corresponding to the reference audio signals (e.g., early reflections) and the AEC filter coefficient values corresponding to the delayed estimated echo audio data (e.g., late reverberations).

In some examples, as described above with regard to FIG. 5, the device 110 may perform constant adaptation 510 to adapt the MCAEC filter coefficient values and the AEC filter coefficients values every audio frame. However, the disclosure is not limited thereto and in some examples, the device 110 may perform alternating adaptation 520 to alternate between adapting the MCAEC filter coefficient values during odd audio frames and adapting the AEC filter coefficient values during even audio frames without departing from the disclosure.

While FIGS. 3-7 illustrate examples of the device 110 including a reduced reference canceller (RRC) that separately processes early reflections and late reverberations, the disclosure is not limited thereto. Additionally or alternatively, the device 110 may also include a reduced reference canceller (RRC) that separately processes multiple microphone signals. For example, the device 110 may perform first echo cancellation processing on a first microphone signal (or a combination of multiple microphone signals) using a MCAEC component and then may perform second echo cancellation processing on additional microphone signals using an AEC component.

Figure 8:
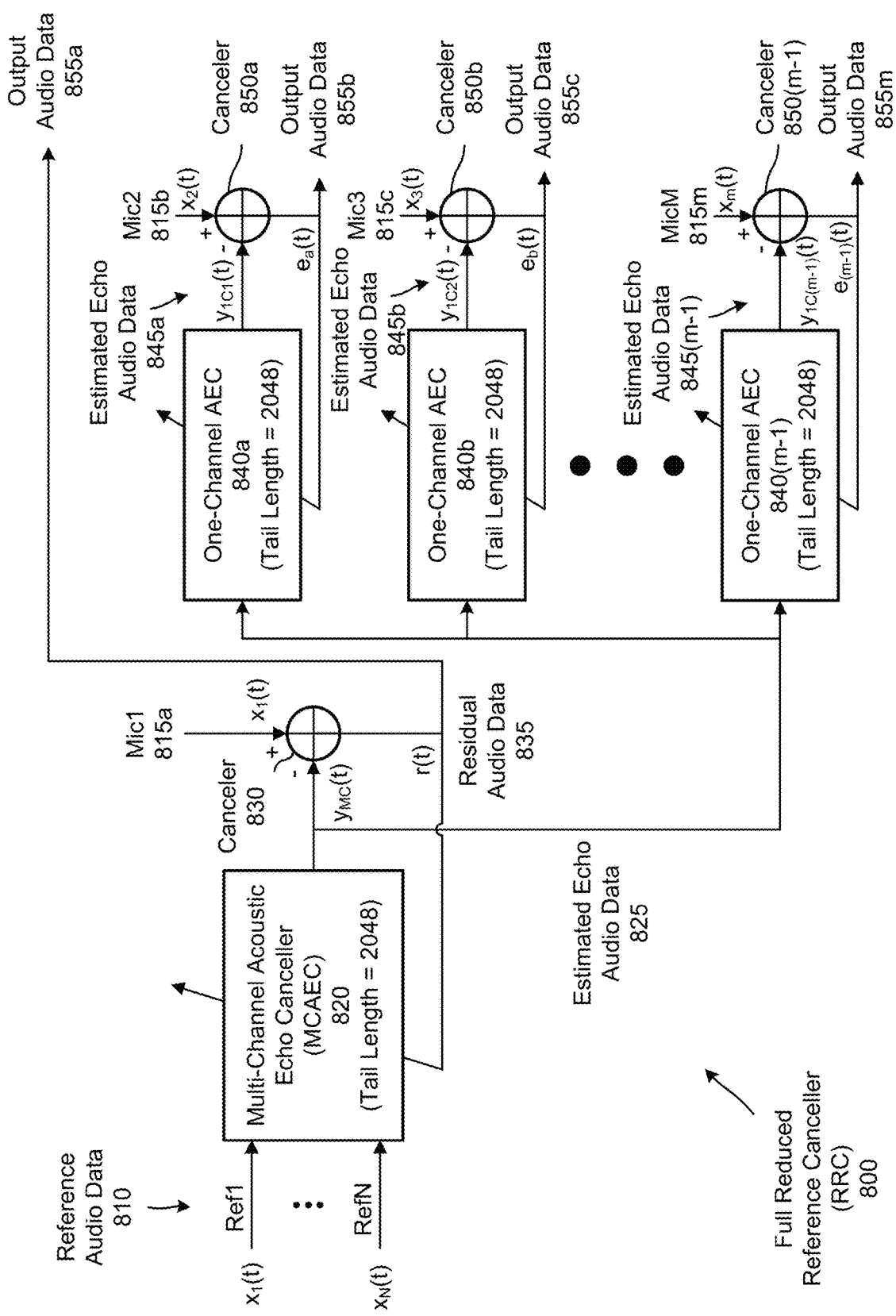
FIG. 8 illustrates an example component diagram for performing reduced reference cancellation using a primary microphone signal according to embodiments of the present disclosure.

FIG. 8 illustrates an example component diagram for performing reduced reference cancellation using a primary microphone signal according to embodiments of the present disclosure. As illustrated in FIG. 8, the device 110 may include a full reduced reference canceller (RRC) 800 configured to perform first echo cancellation processing on a first microphone audio signal Mic1 815a using a MCAEC component 820 and then perform additional echo cancellation processing on remaining microphone audio signals 815b-815m using multiple single-channel AEC components 840a-840(m-1). This reduces a total number of multiplications as each of the remaining microphone signals 815b-815m are processed using a single anchor channel (e.g., single reference signal, such as estimated echo audio data 825 generated by the MCAEC component 820) instead of the multi-channel reference audio data 810.

As illustrated in FIG. 8, the MCAEC component 820 may generate the estimated echo audio data $y_{MC}(t)$ 825 using the reference audio data 810, represented as a plurality of references (e.g., Ref1 $x_1(t)$, Ref2 $x_2(t)$, . . . RefN $x_N(t)$). For example, the MCAEC component 820 may use a first plurality of adaptive filter coefficient values corresponding to the number of reference audio signals (e.g., N) and the number of frequency bands (e.g., K), such that a total number of the first plurality of adaptive filter coefficient values is equal to N×K. As illustrated in FIG. 8, the MCAEC component 820 may have a first tail length (e.g., 2048) that is equal to the overall tail length used during echo cancellation.

A canceler component 830 may subtract the estimated echo audio data $y_{MC}(t)$ 825 from the first microphone audio signal Mic1 815a to generate residual audio data r(t) 835. The MCAEC component 820 may then update (e.g., adapt) the first plurality of adaptive filter coefficients using the residual audio data r(t) 835. The residual audio data r(t) 835 may also be sent to another component as first output audio data 855a.

In the example illustrated in FIG. 8, the first microphone audio signal Mic1 815a is processed separately from the remaining microphone audio signals 815b-815m. For example, the device 110 may include a single-channel AEC component 840 for each of the remaining microphone audio signals 815b-815m. Thus, a first AEC component 840a may use the estimated echo audio data $y_{MC}(t)$ 825 to generate first estimated echo audio data $y_{1C1}(t)$ 845a corresponding to a second microphone audio signal Mic2 815b, a second AEC component 840b may use the estimated echo audio data $y_{MC}(t)$ 825 to generate second estimated echo audio data $y_{1C2}(t)$ 845b corresponding to a third microphone audio signal Mic3 815c, and so on until a final AEC component 840(m-1) may use the estimated echo audio data $y_{MC}(t)$ 825 to generate final estimated echo audio data $y_{1C(m-1)}(t)$ 845(m-1) corresponding to a final microphone audio signal MicM 815m. As illustrated in FIG. 8, the AEC components 840a-840(m-1) may have the first tail length (e.g., 2048) that is equal to the overall tail length used during echo cancellation.

Similarly, a first canceler component 850a may subtract the first estimated echo audio data $y_{1C1}(t)$ 845a from the second microphone audio signal Mic2 815b to generate second output audio data $e_a(t)$ 855b, a second canceler component 850b may subtract the second estimated echo audio data $y_{1C2}(t)$ 845b from the third microphone audio signal Mic3 815c to generate third output audio data $e_b(t)$ 855c, and so on until a final canceler component 850(m-1) may subtract the final estimated echo audio data $y_{1C(m-1)}(t)$ 845(m-1) from the final microphone audio signal MicM 815m to generate final output audio data $e_{(m-1)}(t)$ 855m.

Figure 9:
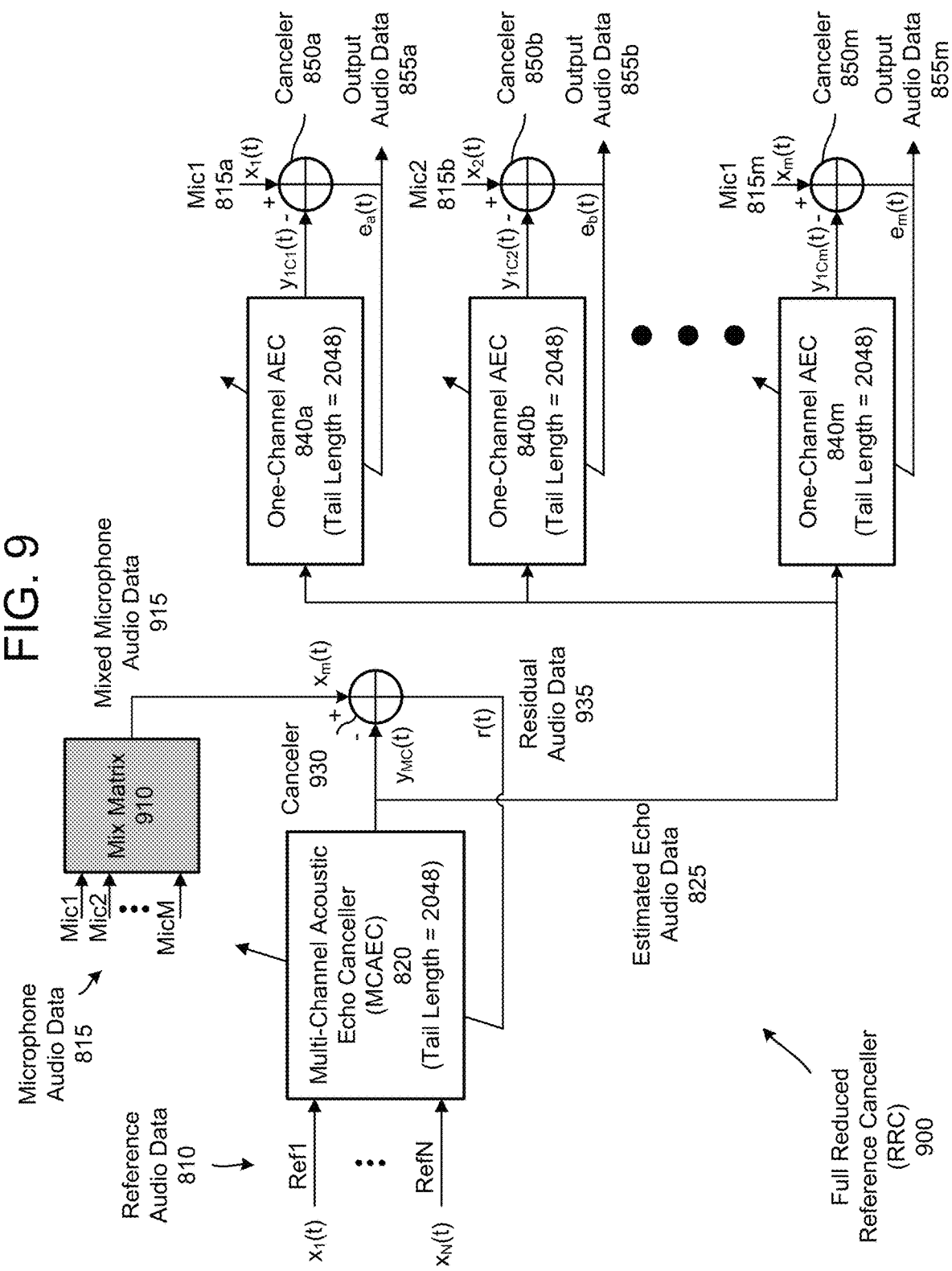
FIG. 9 illustrates an example component diagram for performing reduced reference cancellation using a mixed microphone signal according to embodiments of the present disclosure.

FIG. 9 illustrates an example component diagram for performing reduced reference cancellation using a mixed microphone signal according to embodiments of the present disclosure. As illustrated in FIG. 9, the device 110 may include a full reduced reference canceller (RRC) 900 configured to perform first echo cancellation processing on mixed microphone audio data 915 using a MCAEC component 820 and then perform additional echo cancellation processing on each of the individual microphone audio signals 815a-815m using multiple single-channel AEC components 840a-840m. This reduces a total number of multiplications relative to normal processing, as each of the individual microphone signals 815b-815m are processed using a single anchor channel (e.g., single reference signal, such as estimated echo audio data 825 generated by the MCAEC component 820) instead of the multi-channel reference audio data 810.

In contrast to the full RRC 800 illustrated in FIG. 8, the full RRC 900 illustrated in FIG. 9 performs first echo cancellation processing on the mixed microphone audio data 915 in a first stage and then performs additional echo cancellation processing on all of the microphone audio signals 815a-815m in the second stage. While this increases the total number of multiplications relative to the full RRC 800 (e.g., m single-channel AEC components 840 instead of (m−1)), the mixed microphone audio data 915 may incorporate each of the microphone audio signals 815a-815m, which may improve a performance of the MCAEC component 820 in updating the first plurality of adaptive filter coefficient values.

The device 110 may include a mix matrix component 910 that receives the microphone audio data 815 (e.g., first microphone audio signal Mic1 815a, second microphone audio signal Mic2 815b, and so on until final microphone audio signal MicM 815m) and generates the mixed microphone audio data 915. For example, the mix matrix component 910 may generate a weighted sum of the microphone audio data 815, although the disclosure is not limited thereto. In some examples, the mix matrix component 910 may select a portion of the microphone audio signals 815a-815m without departing from the disclosure.

As illustrated in FIG. 9, the MCAEC component 820 may generate the estimated echo audio data $y_{MC}(t)$ 825 using the reference audio data 810, represented as a plurality of references (e.g., Ref1 $x_1(t)$, Ref2 $x_2(t)$, ... RefN $x_N(t)$). For example, the MCAEC component 820 may use a first plurality of adaptive filter coefficient values corresponding to the number of reference audio signals (e.g., N) and the number of frequency bands (e.g., K), such that a total number of the first plurality of adaptive filter coefficient values is equal to N×K. As illustrated in FIG. 9, the MCAEC component 820 may have a first tail length (e.g., 2048) that is equal to the overall tail length used during echo cancellation.

A canceler component 930 may subtract the estimated echo audio data $y_{MC}(t)$ 825 from the mixed microphone audio data 915 to generate residual audio data r(t) 935. The MCAEC component 820 may then update (e.g., adapt) the first plurality of adaptive filter coefficients using the residual audio data r(t) 935. Unlike the full RRC 800 illustrated in FIG. 8, the device 110 does not output the residual audio data r(t) 935 to other components.

In the example illustrated in FIG. 9, each of the microphone audio signals 815a-815m are processed in a second stage of echo cancellation. For example, the device 110 may include a single-channel AEC component 840 for each of the microphone audio signals 815a-815m. Thus, a first AEC component 840a may use the estimated echo audio data $y_{MC}(t)$ 825 to generate first estimated echo audio data $y_{1C_1}(t)$ 845a corresponding to a first microphone audio signal Mic1 815a, a second AEC component 840b may use the estimated echo audio data $y_{MC}(t)$ 825 to generate second estimated echo audio data $y_{1C_2}(t)$ 845b corresponding to a second microphone audio signal Mic2 815b, and so on until a final AEC component 840m may use the estimated echo audio data $y_{MC}(t)$ 825 to generate final estimated echo audio data $y_{1C_m}(t)$ 845m corresponding to a final microphone audio signal MicM 815m. As illustrated in FIG. 9, the AEC components 840a-840m may have the first tail length (e.g., 2048) that is equal to the overall tail length used during echo cancellation.

Similarly, a first canceler component 850a may subtract the first estimated echo audio data $y_{1C_1}(t)$ 845a from the first microphone audio signal Mic1 815a to generate first output audio data $e_a(t)$ 855a a second canceler component 850b may subtract the second estimated echo audio data $y_{1C_2}(t)$ 845b from the second microphone audio signal Mic2 815b to generate second output audio data $e_b(t)$ 855b, and so on until a final canceler component 850m may subtract the final estimated echo audio data $y_{1C_m}(t)$ 845m from the final microphone audio signal MicM 815m to generate final output audio data $e_m(t)$ 855m.

Figure 10:
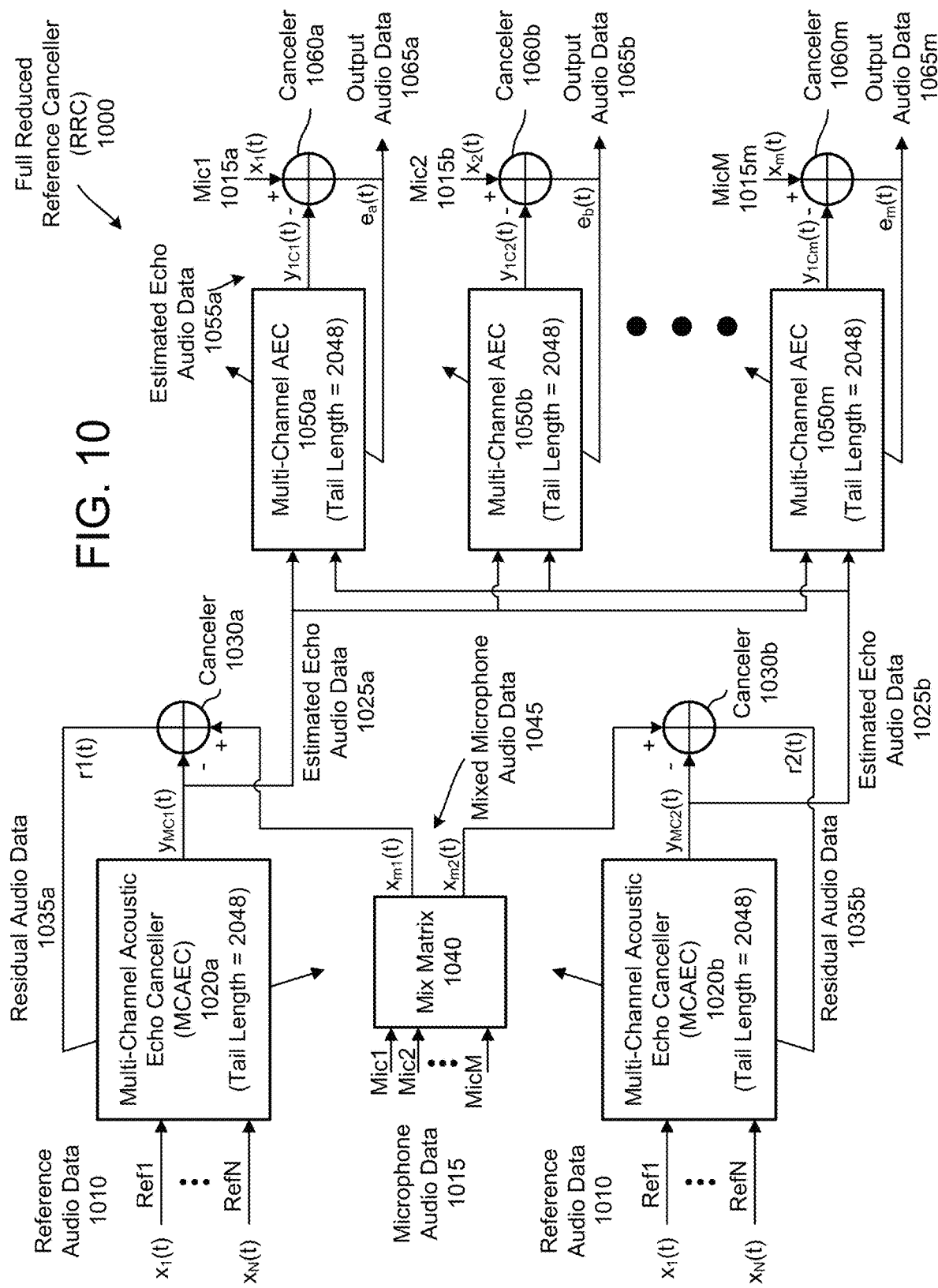
FIG. 10 illustrates an example component diagram for performing reduced reference cancellation using two anchor channels according to embodiments of the present disclosure.

FIG. 10 illustrates an example component diagram for performing reduced reference cancellation using two anchor channels according to embodiments of the present disclosure. As illustrated in FIG. 10, the device 110 may include a full reduced reference canceller (RRC) 1000 configured to perform first echo cancellation processing on mixed microphone audio data 1045 using two MCAEC components 1020a-1020b and then perform additional echo cancellation processing on each of the individual microphone audio signals 1015a-1015m using multiple two-channel AEC components 1050a-1050m. This reduces a total number of multiplications relative to normal processing, as each of the individual microphone signals 1015a-1015m are processed using two reference signals (e.g., two anchor channels, such as first estimated echo audio data 1025a generated by a first MCAEC component 1020a and second estimated echo audio data 1025b generated by a second MCAEC component 1020b) instead of the plurality of reference audio signals included in the reference audio data 1010 (e.g., AEC components 1050a-1050m use two reference signals instead of N reference signals).

In contrast to the full RRC 900 illustrated in FIG. 9, the full RRC 1000 illustrated in FIG. 10 performs first echo cancellation processing on mixed microphone audio data 1045 to generate two reference signals (e.g., first estimated echo audio data 1025a and second estimated echo audio data 1025b) in a first stage and then performs additional echo cancellation processing on all of the microphone audio signals 1015a-1015m in the second stage. While this increases the total number of multiplications relative to the full RRC 900 (e.g., the AEC components 1050a-1050m use two reference signals instead of one), this may improve an audio quality of the output audio data 1065.

As illustrated in FIG. 10, the full RRC 1000 may include a first MCAEC component 1020a and a second MCAEC component 1020b. The first MCAEC component 1020a may generate first estimated echo audio data $y_{MC_1}(t)$ 1025a using the reference audio data 1010, represented as a plurality of references (e.g., Ref1 $x_1(t)$, Ref2 $x_2(t)$, RefN $x_N(t)$). For example, the first MCAEC component 1020a may use a first plurality of adaptive filter coefficient values corresponding to the number of reference audio signals (e.g., N) and the number of frequency bands (e.g., K), such that a total number of the first plurality of adaptive filter coefficient values is equal to N×K. Similarly, the second MCAEC component 1020b may generate second estimated echo audio data $y_{MC2}(t)$ 1025b using the reference audio data 1010, represented as a plurality of references (e.g., Ref1 $x_1(t)$, Ref2 $x_2(t)$, RefN $x_N(t)$). For example, the second MCAEC component 1020b may use a second plurality of adaptive filter coefficient values corresponding to the number of reference audio signals (e.g., N) and the number of frequency bands (e.g., K), such that a total number of the second plurality of adaptive filter coefficient values is equal to N×K. As illustrated in FIG. 10, the MCAEC components 1020a-1020b may have a first tail length (e.g., 2048) that is equal to the overall tail length used during echo cancellation.

As illustrated in FIG. 10, the full RRC 1000 may include a mix matrix component 1040 that receives microphone audio data 1015 (e.g., first microphone audio signal Mic1 1015a, second microphone audio signal Mic2 1015b, and so on until final microphone audio signal MicM 1015m) and generates mixed microphone audio data 1045 (e.g., first mixed microphone audio data $x_{m1}(t)$ and second mixed microphone audio data $x_{m2}(t)$). For example, the mix matrix component 1040 may generate a weighted sum of the microphone audio data 1015, although the disclosure is not limited thereto. In some examples, the mix matrix component 1040 may select a portion of the microphone audio signals 1015a-1015m without departing from the disclosure.

A first canceler component 1030a may subtract the first estimated echo audio data $y_{MC1}(t)$ 1025a from the first mixed microphone audio data $x_{m1}(t)$ 1045a to generate first residual audio data r1(t) 1035a. The first MCAEC component 1020a may then update (e.g., adapt) the first plurality of adaptive filter coefficients using the first residual audio data r1(t) 1035a. Similarly, a second canceler component 1030b may subtract the second estimated echo audio data $y_{MC2}(t)$ 1025b from the second mixed microphone audio data $x_{m2}(t)$ 1045b to generate second residual audio data r2(t) 1035b. The second MCAEC component 1020b may then update (e.g., adapt) the second plurality of adaptive filter coefficients using the second residual audio data r2(t) 1035b.

In some examples, the mixed matrix component 1040 may generate two separate signals. For example, FIG. 10 illustrates the mixed microphone audio data 1045 generating the first mixed microphone audio data $x_{m1}(t)$ and the second mixed microphone audio data $x_{m2}(t)$. Thus, the mix matrix component 1040 may use a first portion of the microphone audio data 1015 and/or first weights (e.g., first weighted sum) to generate the first mixed microphone audio data $x_{m1}(t)$ and may use a second portion of the microphone audio data 1015 and/or second weights (e.g., second weighted sum) to generate the second mixed microphone audio data $x_{m2}(t)$. However, the disclosure is not limited thereto. Instead, the mix matrix component 1040 may generate a single mixed microphone audio signal 1045 used by both the first canceler component 1030a and the second canceler component 1030b without departing from the disclosure.

Additionally or alternatively, while FIG. 10 illustrates the MCAEC components 1020a-1020b each receiving all of the reference audio signals Ref1-RefN, the disclosure is not limited thereto. Instead, the first MCAEC component 1020a may generate the first estimated echo audio data 1025a using a first portion of the reference audio signals (e.g., Ref1-Ref (a)), while the second MCAEC component 1020b may generate the second estimated echo audio data 1025b using a second portion of the reference audio signals (e.g., Ref (a+1)-RefN) without departing from the disclosure.

Thus, the first MCAEC component 1020a may generate the first estimated echo audio data 1025a differently than the second MCAEC component 1020b generates the second estimated echo audio data 1025b. For example, the first MCAEC component 1020a may use the first portion of the reference audio signals 1010 (whereas the second MCAEC component 1020b uses the second portion of the reference audio signals 1010), may include a different number of adaptive filter coefficient values than the second MCAEC component 1020b (e.g., a first number of the first plurality of adaptive filter coefficient values may be different than a second number of the second plurality of adaptive filter coefficient values), may update the first plurality of adaptive filter coefficient values using the first residual audio data 1035a generated using the first mixed microphone audio data $x_{m1}(t)$ 1045a instead of the second mixed microphone audio data $x_{m2}(t)$ 1045b, and/or the like without departing from the disclosure.

In the example illustrated in FIG. 10, each of the microphone audio signals 1015a-1015m are processed in a second stage of echo cancellation. For example, the device 110 may include a two-channel AEC component 1050 for each of the microphone audio signals 1015a-1015m. Thus, a first AEC component 1050a may use the first estimated echo audio data $y_{MC1}(t)$ 1025a and/or the second estimated echo audio data $y_{MC2}(t)$ 1025b to generate first estimated echo audio data $y_{1C1}(t)$ 1055 corresponding to a first microphone audio signal Mic1 1015a, a second AEC component 1050b may use the first estimated echo audio data $y_{MC1}(t)$ 1025a and/or the second estimated echo audio data $y_{MC2}(t)$ 1025b to generate second estimated echo audio data $y_{1C2}(t)$ 1055b corresponding to a second microphone audio signal Mic2 1015b, and so on until a final AEC component 1050m may use the first estimated echo audio data $y_{MC1}(t)$ 1025a and/or the second estimated echo audio data $y_{MC2}(t)$ 1025b to generate final estimated echo audio data $y_{1Cm}(t)$ 1055m corresponding to a final microphone audio signal MicM 1015m. As illustrated in FIG. 10, the MCAEC components 1020a-1020b and the AEC components 1050a-1050m may have the first tail length (e.g., 2048) that is equal to the overall tail length used during echo cancellation.

Similarly, a first canceler component 1060a may subtract the first estimated echo audio data $y_{1C1}(t)$ 1055a from the first microphone audio signal Mic1 1015a to generate first output audio data $e_a(t)$ 1065a, a second canceler component 1060b may subtract the second estimated echo audio data $y_{1C2}(t)$ 1055b from the second microphone audio signal Mic2 1015b to generate second output audio data $e_b(t)$ 1065b, and so on until a final canceler component 1060m may subtract the final estimated echo audio data $y_{1Cm}(t)$ 1055m from the final microphone audio signal MicM 1015m to generate final output audio data $e_m(t)$ 1065m.

While FIG. 10 illustrates the AEC components 1050a-1050m using two reference audio signals (e.g., the first estimated echo audio data $y_{MC1}(t)$ 1025a and the second estimated echo audio data $y_{MC2}(t)$ 1025b), the disclosure is not limited thereto. In some examples, the device 110 may select a single reference audio signal for each of the AEC components 1050a-1050m. For example, the device 110 may group a first portion of the microphone audio signals 1015a-1015j together and use the first estimated echo audio data $y_{MC1}(t)$ 1025a for a first portion of the AEC components 1050a-1050j, and may group a second portion of the microphone audio signals 1015(j+1)-1015m together and use the second estimated echo audio data $y_{MC2}(t)$ 1025b for a second portion of the AEC components 1050(j+1)-1050m.

Additionally or alternatively, the device 110 may generate the first mixed microphone audio data $x_{m1}(t)$ 1045a using the first portion of the microphone audio signals 1015a-1015j and may generate the second mixed microphone audio data $x_{m2}(t)$ 1045b using the second portion of the microphone audio signals 1015(j+1)-1015m. Thus, the first plurality of adaptive filter coefficient values may be updated using the first residual audio data 1035a after subtracting the first estimated echo audio data $y_{MC1}(t)$ 1025a from the first mixed microphone audio data $x_{m1}(t)$ 1045a, which corresponds to the first portion of the microphone audio signals 1015a-1015j. Then, the first estimated echo audio data $y_{MC1}(t)$ 1025a may be used as a single reference signal for the AEC components 1050a-1050j that correspond to the first portion of the microphone audio signals 1015a-1015j. Similarly, the second plurality of adaptive filter coefficient values may be updated using the second residual audio data 1035b after subtracting the second estimated echo audio data $y_{MC2}(t)$ 1025b from the second mixed microphone audio data $x_{m2}(t)$ 1045b, which corresponds to the second portion of the microphone audio signals 1015(j+1)-1015m. Then, the second estimated echo audio data $y_{MC2}(t)$ 1025b may be used as a single reference signal for the AEC components 1050(j+1)-1050m that correspond to the second portion of the microphone audio signals 1015(j+1)-1015m.

While FIG. 10 illustrates the estimated echo audio data 1025 corresponding to two separate reference signals, the disclosure is not limited thereto. Instead, the full RRC 1000 may include three or more MCAEC components 1020 and may generate three or more estimated echo audio signals without departing from the disclosure.

FIG. 11 illustrates examples of reduced complexity associated with applying reduced reference cancellation according to embodiments of the present disclosure. As illustrated in FIG. 11, normal processing 1110 (e.g., MCAEC processing separately for each microphone audio signal) for 2048 samples with five reference channels (e.g., reference audio signals) and six input channels (e.g., microphone audio signals) results in processing 61440 total multiplications (e.g., 2048 samples×5 reference channels×6 input channels=61440 total multiplications).

In contrast, performing RRC processing 1120 (e.g., MCAEC processing for a first microphone signal, single-channel AEC processing for remaining microphone signals), as illustrated in FIG. 8, results in a 67% decrease in the total multiplications (relative to normal processing 1110). For example, processing 2048 samples using the MCAEC component 820 and processing 2048 samples using five AEC components 840 results in processing 20480 total multiplications (e.g., 2048 samples×5 reference channels×1 input channel=10240 multiplications, 2048 samples×1 reference channel×5 input channels=10240 multiplications, and 10240+10240=20480 total multiplications).

Similarly, performing RRC processing 1130 (e.g., MCAEC processing for a mixed microphone signal, single-channel AEC processing for remaining microphone signals), as illustrated in FIG. 9, results in a 63% decrease in the total multiplications (relative to normal processing 1110). For example, processing 2048 samples using the MCAEC component 820 and processing 2048 samples using six AEC components 840 results in processing 22528 total multiplications (e.g., 2048 samples×5 reference channels×1 input channel=10240 multiplications, 2048 samples×1 reference channel×6 input channels=12288 multiplications, and 10240+12288=22528 total multiplications).

Using two anchor channels, as illustrated in FIG. 10, improves an audio quality of the output audio while also increasing the total multiplications. To illustrate an example, performing RRC processing 1140 (e.g., MCAEC processing for two mixed microphone signals, two-channel AEC processing for the microphone signals), as illustrated in FIG. 10, results in a 27% decrease in the total multiplications (relative to normal processing 1110). For example, processing 2048 samples using the MCAEC component 1020 and processing 2048 samples using six MCAEC components 1050 results in processing 32768 total multiplications (e.g., 2048 samples×5 reference channels×2 input channel=20480 multiplications, 2048 samples×2 reference channel×6 input channels=24576 multiplications, and 20480+24576=45056 total multiplications).

If the device 110 selects a single anchor channel for each microphone audio signal (e.g., single-channel AEC components 1050), performing RRC processing 1150 (e.g., MCAEC processing for two mixed microphone signals, single-channel AEC processing for the microphone signals), results in a 47% decrease in the total multiplications (relative to normal processing 1110). For example, processing 2048 samples using the MCAEC component 1020 and processing 2048 samples using six AEC components 1050 results in processing 22528 total multiplications (e.g., 2048 samples×5 reference channels×2 input channel=20480 multiplications, 2048 samples×1 reference channel×6 input channels=12288 multiplications, and 20480+12288=32768 total multiplications).

Figure 12:
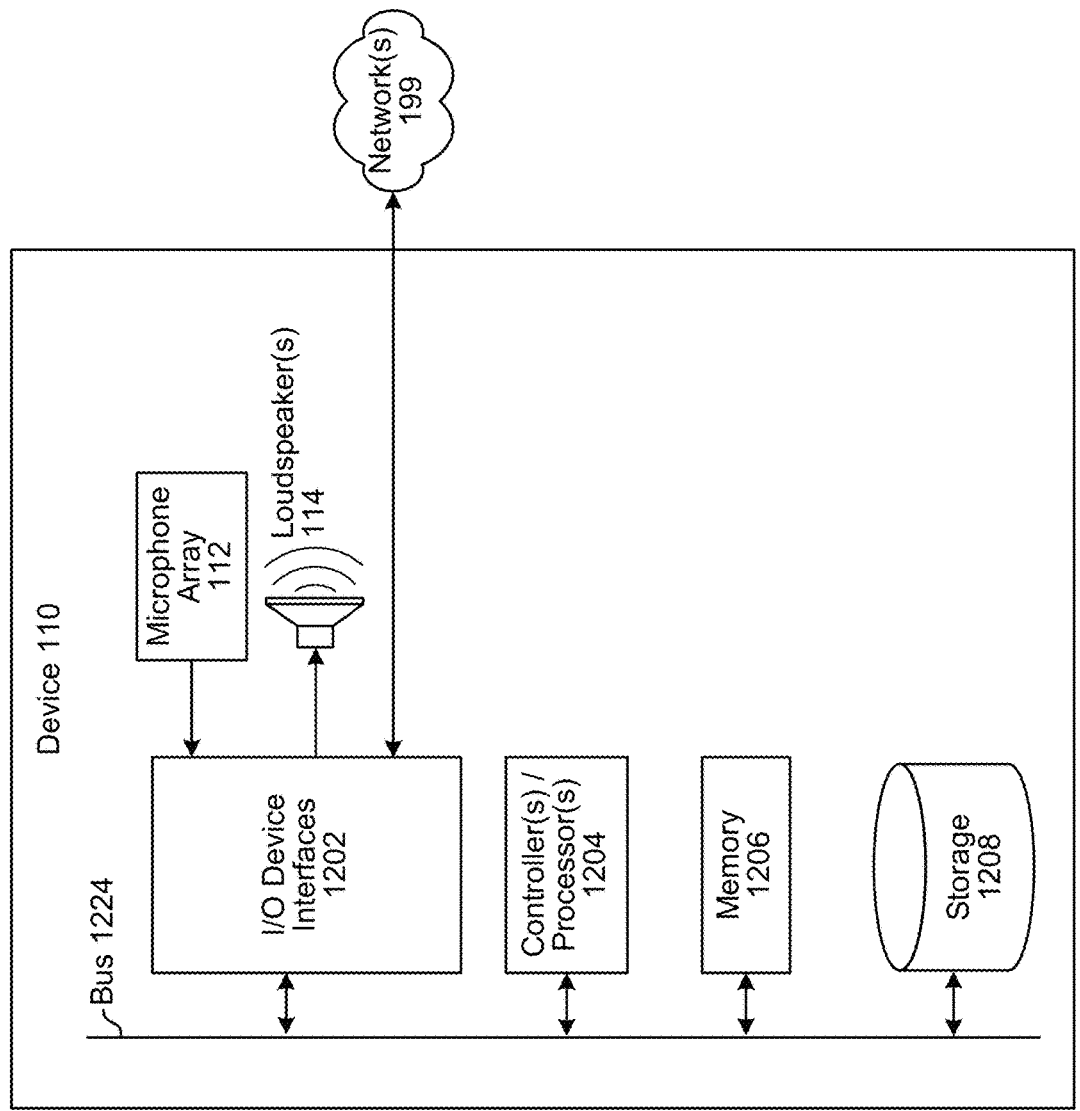
FIG. 12 is a block diagram conceptually illustrating example components of a system according to embodiments of the present disclosure.

FIG. 12 is a block diagram conceptually illustrating example components of a system \ according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeakers 114. The audio output device may be integrated into a single device or may be separate.

As illustrated in FIG. 12, the device 110 may include an address/data bus 1224 for conveying data among components of the device 110. Each component within the device 110 may also be directly connected to other components in addition to (or instead of) being connected to other components across the bus 1224.

The device 110 may include one or more controllers/processors 1204, which may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform operations discussed herein). The data storage component 1208 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

The device 110 includes input/output device interfaces 1202. A variety of components may be connected through the input/output device interfaces 1202. For example, the device 110 may include one or more microphone(s) 112 (e.g., a plurality of microphones 112 in a microphone array), two or more loudspeakers 114, and/or a media source such as a digital media player (not illustrated) that connect through the input/output device interfaces 1202, although the disclosure is not limited thereto. Instead, the number of microphones 112 and/or the number of loudspeakers 114 may vary without departing from the disclosure. In some examples, the microphones 112 and/or loudspeakers 114 may be external to the device 110, although the disclosure is not limited thereto. The input/output interfaces 1202 may include A/D converters (not illustrated) and/or D/A converters (not illustrated).

The input/output device interfaces 1202 may also include an interface for an external peripheral device connection such as universal serial bus (USB), FireWire, Thunderbolt, Ethernet port or other connection protocol that may connect to network(s) 199.

The input/output device interfaces 1202 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1208 to be executed by controller(s)/processor(s) 1204 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1204, using the memory 1206 as temporary "working" storage at runtime. The computer instructions may be stored in a non-transitory manner in non-volatile memory 1206, storage 1208, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the components described above may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising, by a device:
   sending first audio data to a first loudspeaker of the device to generate a first portion of output audio;
   sending second audio data to a second loudspeaker of the device to generate a second portion of the output audio;
   generating third audio data using a microphone of the device, the third audio data including a first representation of speech and a first representation of the output audio;
   generating fourth audio data representing a first echo estimate corresponding to early reflections of the output audio, the fourth audio data including a second representation of the output audio, wherein the fourth audio data is generated using a multi-channel adaptive filter, the first audio data, the second audio data, and a first plurality of adaptive filter coefficient values of the multi-channel adaptive filter;
   subtracting the fourth audio data from the third audio data to generate fifth audio data, the fifth audio data including a second representation of the speech and a third representation of the output audio;
   applying a first delay to the fourth audio data to generate sixth audio data, wherein applying the first delay comprises adding one or more blank audio frames to a beginning of the fourth audio data;
   generating seventh audio data representing a second echo estimate corresponding to late reverberations of the output audio, the seventh audio data including a fourth representation of the output audio, wherein the seventh audio data is generated using a single-channel adaptive filter, the sixth audio data, and a second plurality of adaptive filter coefficient values of the single-channel adaptive filter; and
   subtracting the seventh audio data from the fifth audio data to generate first output audio data, the first output audio data including a third representation of the speech that is isolated from the output audio.

2. The computer-implemented method of claim 1, further comprising:
   generating, during a first time period, a third plurality of adaptive filter coefficient values using the fifth audio data;
   generating, during the first time period, a fourth plurality of adaptive filter coefficient values using the first output audio data;
   sending, after the first time period, eighth audio data to the first loudspeaker to generate a first portion of second output audio;
   sending ninth audio data to the second loudspeaker to generate a second portion of the second output audio;
   generating tenth audio data using the microphone;
   generating eleventh audio data representing a third echo estimate corresponding to early reflections of the second output audio, wherein the eleventh audio data is generated using the multi-channel adaptive filter, the eighth audio data, the ninth audio data, and the third plurality of adaptive filter coefficient values of the multi-channel adaptive filter;
   subtracting the eleventh audio data from the tenth audio data to generate twelfth audio data;
   applying the first delay to the twelfth audio data to generate thirteenth audio data;
   generating fourteenth audio data representing a fourth echo estimate corresponding to late reverberations of the second output audio, wherein the fourteenth audio data is generated using the single-channel adaptive filter, the thirteenth audio data, and the fourth plurality of adaptive filter coefficient values of the single-channel adaptive filter; and
   subtracting the fourteenth audio data from the twelfth audio data to generate second output audio data.

3. A computer-implemented method, the method comprising:
   receiving a plurality of reference audio signals corresponding to output audio generated by two or more loudspeakers of a device;
   receiving a first audio signal from a microphone;
   generating a second audio signal using the plurality of reference audio signals and a first plurality of filter coefficient values of a multi-channel adaptive filter, the second audio signal representing a first echo estimate corresponding to first reflections of the output audio;
   subtracting the second audio signal from the first audio signal to generate a third audio signal;
   applying a first delay to the second audio signal to generate a fourth audio signal;
   generating a fifth audio signal using the fourth audio signal and a second plurality of filter coefficient values of a single-channel adaptive filter, the fifth audio signal representing a second echo estimate corresponding to second reflections of the output audio occurring after the first reflections; and
   subtracting the fifth audio signal from the third audio signal to generate a first output audio signal.

4. The computer-implemented method of claim 3, wherein generating the second audio signal further comprises:
   generating a first portion of the second audio signal using a first filter coefficient value of the first plurality of filter coefficient values and a first portion of a first reference signal of the plurality of reference audio signals, the first portion of the first reference signal being within a first frequency range;
   generating a second portion of the second audio signal using a second filter coefficient value of the first plurality of filter coefficient values and a second portion of the first reference signal, the second portion of the first reference signal being within a second frequency range; and
   generating the second audio signal by combining the first portion of the second audio signal and the second portion of the second audio signal.

5. The computer-implemented method of claim 3, further comprising:
   generating, during a first time period, a third plurality of filter coefficient values using the third audio signal;

generating, during the first time period, a fourth plurality of filter coefficient values using the first output audio signal;
receiving a second plurality of reference audio signals;
receiving a sixth audio signal from the microphone;
generating a seventh audio signal using the second plurality of reference audio signals and the third plurality of filter coefficient values;
subtracting the seventh audio signal from the sixth audio signal to generate an eighth audio signal;
applying the first delay to the eighth audio signal to generate a ninth audio signal;
generating a tenth audio signal using the ninth audio signal and the fourth plurality of filter coefficient values; and
subtracting the tenth audio signal from the eighth audio signal to generate a second output audio signal.

6. The computer-implemented method of claim 3, further comprising:
generating a third plurality of filter coefficient values using the third audio signal;
receiving a second plurality of reference audio signals;
receiving a sixth audio signal from the microphone;
generating a seventh audio signal using the second plurality of reference audio signals and the third plurality of filter coefficient values;
subtracting the seventh audio signal from the sixth audio signal to generate an eighth audio signal;
applying the first delay to the eighth audio signal to generate a ninth audio signal;
generating a tenth audio signal using the ninth audio signal and the second plurality of filter coefficient values;
subtracting the tenth audio signal from the eighth audio signal to generate a second output audio signal; and
generating, during a second time period, a fourth plurality of filter coefficient values using the second output audio signal.

7. The computer-implemented method of claim 3, further comprising:
determining a first tail length associated with the multi-channel adaptive filter; and
determining the first delay based on the first tail length.

8. The computer-implemented method of claim 3, wherein:
the multi-channel adaptive filter has a first tail length and performs echo cancellation using two or more reference signals of the plurality of reference audio signals; and
the single-channel adaptive filter has a second tail length that is different than the first tail length and performs echo cancellation using a single reference signal.

9. The computer-implemented method of claim 3, further comprising:
determining, using a first filter, a first portion of the first audio signal corresponding to a first frequency range;
generating a sixth audio signal using the plurality of reference audio signals and a third plurality of filter coefficient values;
subtracting the sixth audio signal from the first portion of the first audio signal to generate a seventh audio signal; and
generating a second output audio signal by combining the seventh audio signal and the first output audio signal.

10. The computer-implemented method of claim 3, wherein receiving the first audio signal further comprises:
receiving a plurality of audio signals from a microphone array, the microphone array including the microphone; and
generating the first audio signal using a weighted sum of the plurality of audio signals.

11. The computer-implemented method of claim 3, further comprising:
receiving a sixth audio signal from a second microphone;
generating a seventh audio signal using the third audio signal and a third plurality of filter coefficient values; and
subtracting the seventh audio signal from the sixth audio signal to generate a second output audio signal.

12. A system comprising:
at least one processor; and
memory including instructions operable to be executed by the at least one processor to cause the system to:
receive a plurality of reference audio signals corresponding to output audio generated by two or more loudspeakers of a device;
receive a first audio signal from a microphone;
generate a second audio signal using the plurality of reference audio signals and a first plurality of filter coefficient values of a multi-channel adaptive filter, the second audio signal representing a first echo estimate corresponding to first reflections of the output audio;
subtract the second audio signal from the first audio signal to generate a third audio signal;
apply a first delay to the second audio signal to generate a fourth audio signal;
generate a fifth audio signal using the fourth audio signal and a second plurality of filter coefficient values of a single-channel adaptive filter, the fifth audio signal representing a second echo estimate corresponding to second reflections of the output audio occurring after the first reflections; and
subtract the fifth audio signal from the third audio signal to generate a first output audio signal.

13. The system of claim 12, wherein the memory further comprises instructions that, when executed by the at least one processor, further cause the system to:
generate a first portion of the second audio signal using a first filter coefficient value of the first plurality of filter coefficient values and a first portion of a first reference signal of the plurality of reference audio signals, the first portion of the first reference signal being within a first frequency range;
generate a second portion of the second audio signal using a second filter coefficient value of the first plurality of filter coefficient values and a second portion of the first reference signal, the second portion of the first reference signal being within a second frequency range; and
generate the second audio signal by combining the first portion of the second audio signal and the second portion of the second audio signal.

14. The system of claim 12, wherein the memory further comprises instructions that, when executed by the at least one processor, further cause the system to:
generate, during a first time period, a third plurality of filter coefficient values using the third audio signal;
generate, during the first time period, a fourth plurality of filter coefficient values using the first output audio signal;
receive a second plurality of reference audio signals;
receive a sixth audio signal from the microphone;

generate a seventh audio signal using the second plurality of reference audio signals and the third plurality of filter coefficient values;
subtract the seventh audio signal from the sixth audio signal to generate an eighth audio signal;
apply the first delay to the eighth audio signal to generate a ninth audio signal;
generate a tenth audio signal using the ninth audio signal and the fourth plurality of filter coefficient values; and
subtract the tenth audio signal from the eighth audio signal to generate a second output audio signal.

15. The system of claim 12, wherein the memory further comprises instructions that, when executed by the at least one processor, further cause the system to:
generate a third plurality of filter coefficient values using the third audio signal;
receive a second plurality of reference audio signals;
receive a sixth audio signal from the microphone;
generate a seventh audio signal using the second plurality of reference audio signals and the third plurality of filter coefficient values;
subtract the seventh audio signal from the sixth audio signal to generate an eighth audio signal;
apply the first delay to the eighth audio signal to generate a ninth audio signal;
generate a tenth audio signal using the ninth audio signal and the second plurality of filter coefficient values;
subtract the tenth audio signal from the eighth audio signal to generate a second output audio signal; and
generate, during a second time period, a fourth plurality of filter coefficient values using the second output audio signal.

16. The system of claim 12, wherein the memory further comprises instructions that, when executed by the at least one processor, further cause the system to:
determine a first tail length associated with the multi-channel adaptive filter; and
determine the first delay based on the first tail length.

17. The system of claim 12, wherein:
the multi-channel adaptive filter has a first tail length and performs echo cancellation using two or more reference signals of the plurality of reference audio signals; and
the single-channel adaptive filter has a second tail length that is different than the first tail length and performs echo cancellation using a single reference signal.

18. The system of claim 12, wherein the memory further comprises instructions that, when executed by the at least one processor, further cause the system to:
determine, using a first filter, a first portion of the first audio signal corresponding to a first frequency range;
subtract the second audio signal from a second portion of the first audio signal to generate the third audio signal;
generate a sixth audio signal using the plurality of reference audio signals and a third plurality of filter coefficient values;
subtract the sixth audio signal from the first portion of the first audio signal to generate a seventh audio signal; and
generate a second output audio signal by combining the seventh audio signal and the first output audio signal.

19. The system of claim 12, wherein the memory further comprises instructions that, when executed by the at least one processor, further cause the system to:
receive a plurality of audio signals from a microphone array, the microphone array including the microphone; and
generate the first audio signal using a weighted sum of the plurality of audio signals.

20. The system of claim 12, wherein the memory further comprises instructions that, when executed by the at least one processor, further cause the system to:
receive a sixth audio signal from a second microphone;
generate a seventh audio signal using the third audio signal and a third plurality of filter coefficient values; and
subtract the seventh audio signal from the sixth audio signal to generate a second output audio signal.

* * * * *